United States Patent
Mildh et al.

(10) Patent No.: US 11,394,455 B2
(45) Date of Patent: Jul. 19, 2022

(54) METHOD FOR ENABLING NEW RADIO (NR) INTEGRATED ACCESS AND BACKHAUL (IAB) NODES TO OPERATE IN NON-STANDALONE (NSA) CELLS

(71) Applicant: TELEFONAKTIEBOLAGET LM ERICSSON (PUBL), Stockholm (SE)

(72) Inventors: Gunnar Mildh, Sollentuna (SE); Ajmal Muhammad, Sollentuna (SE); Janne Peisa, Espoo (FI); Oumer Teyeb, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/970,625

(22) PCT Filed: Feb. 14, 2019

(86) PCT No.: PCT/IB2019/051211
§ 371 (c)(1),
(2) Date: Aug. 17, 2020

(87) PCT Pub. No.: WO2019/159107
PCT Pub. Date: Aug. 22, 2019

(65) Prior Publication Data
US 2021/0075496 A1     Mar. 11, 2021

Related U.S. Application Data
(60) Provisional application No. 62/710,355, filed on Feb. 16, 2018.

(51) Int. Cl.
*H04B 7/155* (2006.01)
*H04W 40/22* (2009.01)
(Continued)

(52) U.S. Cl.
CPC ........ *H04B 7/15528* (2013.01); *H04W 40/22* (2013.01); *H04W 48/12* (2013.01); *H04W 84/047* (2013.01)

(58) Field of Classification Search
CPC .. H04L 7/15528; H04W 40/22; H04W 48/12; H04W 84/047
See application file for complete search history.

(56) References Cited

U.S. PATENT DOCUMENTS
2018/0048413 A1   2/2018   Liu
2018/0049083 A1   2/2018   Kubota
(Continued)

FOREIGN PATENT DOCUMENTS
CA    3027284 A1    12/2017
CN    104272844 A   1/2015
(Continued)

OTHER PUBLICATIONS
Ericsson, "Reserving cells for operators and future use", Tdoc R2-1802319 (Revision of R2-1800370), 3GPP TSG-RAN WG2#NR AH1801, Vancouver, Canada, Jan. 22-26, Nov.-Dec. 1, 2018.
(Continued)

*Primary Examiner* — Hashim S Bhatti

(57) ABSTRACT

A method for enabling operations for a relay node comprises receiving, at a first network node, a system information block including a first indication and a second indication, wherein the first indication indicates that a first cell is a non-standalone cell and is barred for standalone user equipments (UEs), and the second indication indicates that the first network node is able to access the first cell. The method further comprises identifying, at the first network node, whether the first network node is able to access the first cell based on the second indication in the system information block. The method may improve a performance in the network by enabling a relay node to operate in a non-
(Continued)

standalone cell, such that both access and backhaul in E-UTRAN New Radio Dual Connectivity (EN-DC) are supported.

22 Claims, 27 Drawing Sheets

(51) Int. Cl.
*H04W 48/12* (2009.01)
*H04W 84/04* (2009.01)

(56) References Cited

U.S. PATENT DOCUMENTS

2019/0069205 A1* 2/2019 Lee ................. H04W 48/20
2020/0169929 A1* 5/2020 Yang ................. H04W 36/04

FOREIGN PATENT DOCUMENTS

| | | |
|---|---|---|
| JP | 2011-004376 A | 1/2011 |
| RU | 2571720 C2 | 12/2015 |
| WO | 2017062244 A1 | 4/2017 |

OTHER PUBLICATIONS

3GPP, 3rd Generation Partnership Project; Technical Specification Group Radio Access Network; Study on Integrated Access and Backhaul; (Release 15), TR 38.874 V0. 1.0, Feb. 2018.
Ericsson, "Supporting EN-DC for IAB," R3-181312, 3GPP TSG-RAN WG3 #99, Athens, Greece, Feb. 26 -Mar. 2, 2018.
Ericsson, "Support for EN-DC for IAB," R2-1801023, 3GPP TSG-RAN WG2 NR AH1801, Vancouver, Canada, Jan. 22-26, 2018.
AT&T, et al., "Proposals on IAB Use Cases and Deployment Scenarios," R2-1801621, 3GPP TSG-RAN WG2 NR Ad hoc 1801, Vancouver, Canada, Jan. 22-26, 2018.
Oppo, et al., "Discussion on CellBarred IE in NR SIB1," R2-1801788, 3GPP TSG-RAN WG2#101, Athens, Greece, Feb. 26-Mar. 2, 2018.
Ericsson, "5G indicator for EN-DC," Tdoc R2-1713443, 3GPP TSG-RAN WG2 #100, Reno, Nevada, USA, Nov. 27-Dec. 1, 2017.

* cited by examiner

METHOD FOR ENABLING NEW RADIO (NR) INTEGRATED ACCESS AND BACKHAUL (IAB) NODES TO OPERATE IN NON-STANDALONE (NSA) CELLS

This application is a 371 of International Application No. PCT/IB2019/051211, filed Feb. 14, 2019, which claims the benefit of U.S. Provisional Application No. 62/710,355, filed Feb. 16, 2018, the disclosures of which are fully incorporated herein by reference.

TECHNICAL FIELD

Particular embodiments relate to the field of enabling relay nodes to operate in non-standalone cells, and more specifically, to methods, apparatus and systems for of enabling relay nodes to operate in non-standalone cells via standalone operations.

BACKGROUND

Regarding 3GPP Evolved Universal Terrestrial Radio Access Network (E-UTRAN) or 4G architecture and Evolved Packet Core (EPC) architecture, Evolved Packet System (EPS) is the Evolved 3GPP Packet Switched Domain and consists of EPC and E-UTRAN.

FIG. 1 illustrates an overview of the EPC architecture. This architecture is defined in 3GPP TS 23.401. Refer to the specification for a definition of Packet Data Network (PDN) Gateway (PGW), Serving Gateway (SGW), Policy and Charging Rules Function (PCRF), Mobility Management Entity (MME), and mobile device, such as user equipment (UE). The LTE radio access, E-UTRAN, consists of one or more eNBs.

FIG. 2 shows the overall E-UTRAN architecture and is further defined in, for example, 3GPP TS 36.300. The E-UTRAN consists of eNBs, providing the E-UTRA user plane and control plane protocol terminations towards the UE. The E-UTRAN user plane may be Packet Data Convergence Protocol/Radio Link Control/Medium Access Control/Physical Layer (PDCP/RLC/MAC/PHY) and the control plane may be Radio Resource Control (RRC). The eNBs are interconnected with each other by means of the X2 interface. The eNBs are also connected by means of the S1 interface to the EPC, more specifically to the MME by means of the S1-MME interface and to the S-GW by means of the S1-U interface.

FIGS. 3 and 4 illustrate the main parts of the EPC Control Plane (CP) and User Plane (UP) architectures. For the current 3GPP Next Generation or 5G RAN architecture, the current 5G RAN architecture is described in TS38.401v0.4.1.

FIG. 5 illustrates a current, overall 5G RAN architecture. The NG architecture may be further described as follows: (1) The NG-RAN consists of a set of gNBs connected to the 5G Core network (5GC) through the NG; (2) An gNB may support Frequency Division Duplex (FDD) mode, Time Division Duplex (TDD) mode or dual mode operation; (3) gNBs may be interconnected through the Xn; (4) A gNB may consist of a gNB-Centralized Unit (CU) and gNB-/Distributed Units (DUs), and a gNB-CU and a gNB-DU is connected via F1 logical interface; and (5) One gNB-DU is connected to only one gNB-CU. Note that for resiliency, a gNB-DU may be connected to multiple gNB-CU by appropriate implementation.

NG, Xn and F1 are logical interfaces. The NG-RAN is layered into a Radio Network Layer (RNL) and a Transport Network Layer (TNL). The NG-RAN architecture, i.e. the NG-RAN logical nodes and interfaces between them, is defined as part of the RNL. For each NG-RAN interface, for example, NG, Xn, F1, the related TNL protocol and the functionality are specified. The TNL provides services for user plane transport and signaling transport. In NG-Flex configuration, each gNB is connected to all 5GC nodes within a pool area. The pool area is defined in 3GPP TS 23.501. If security protection for control plane and user plane data on TNL of NG-RAN interfaces has to be supported, Network Domain Security (NDS)/IP defined in 3GPP TS 33.401 shall be applied.

For support for dual connectivity (DC), in the context of RAN 5G architectures, 3GPP has agreed that dual connectivity is supported. Such mechanism consists of establishing master and secondary nodes, and it consists of distributing user plane (UP) traffic to the master node (MN) and secondary nodes (SNs) according to the best possible traffic and radio resource management. CP traffic is assumed to terminate in one node only, i.e. the MN. FIGS. 6 and 7 illustrate the protocol and interfaces involved in dual connectivity specified in TS38.300v0.6.0.

FIG. 6 illustrates that the Master gNB (MgNB) is able to forward PDCP bearer traffic to a Secondary gNB (SgNB), while FIG. 7 illustrates the case where the SgNB forwards PDCP bearer traffic to the MgNB. It needs to be considered that the MgNB and SgNB may be subject to the RAN split architecture outlined above and made of CUs and DUs.

Furthermore, in the context of 5G standardization, multi-RAT dual connectivity (MR-DC) is being specified. FIG. 8 illustrates principles of MR-DC in 5G specified in TS 37.340. When MR-DC is applied, a RAN node, which is the MN, anchors the control plane towards the core network (CN), while another RAN node, which is the SN, provides control and user plane resources to the UE via coordination with the MN.

FIG. 9 illustrates radio protocol architecture for Master Cell Group (MCG), MCG split, Secondary Cell Group (SCG) and SCG split bearers in MR-DC with 5GC specified in TS 37.340. Within the scope of MR-DC, various user plane/bearer type solutions are possible.

In TS 38.401, overall procedures are depicted, including signaling flows in gNB-CU/gNB-DU architecture, e.g. initial access from the UE, inter-DU mobility, and the like. One specific flavor of MR-DC is called EN-DC. In this case, the LTE eNB is the MN and the NR gNB is the SN.

Regarding support for non-standalone (NSA) NR deployments, in 3GPP Rel-15, it has been agreed to support NSA NR deployments. In this case, the NR RAT does not support standalone operation, i.e. it cannot serve UEs by itself. Instead, dual connectivity, e.g. EN-DC, is used to serve end users. This means that UEs first connected to LTE MeNB which later setup the NR leg in the SgNB. FIG. 10 illustrates an example signaling flows showing this procedure.

In the procedure above, the UE first performs a connection in LTE from step 1 to step 11. At this point, the network has instructed the UE to measure on NR RAT, and the measurement configuration may come at any point after or along with message 11. Then, the UE sends a measurement report regarding NR RAT. The network may then initiate the setup of the NR leg from step 16 to step 26. For EN-DC, the EPC core network is used.

In addition to Non-standalone operation, NR will also support SA operation. In this case, the UEs that support SA NR will camp on NR cells and perform access directly to the NR system, i.e. no connection to LTE first is required to access the NR. A SA capable NR gNB will broadcast System Information (SI) in the cell which is used to access the NR cell, in a way similar to LTE operation, though the contents of the SIs as well as the manner in which they are broadcasted, for example, periodicity, may be different from LTE.

Regarding Integrated Access Backhaul (JAB), densification via the deployment of more and more base stations, such as macro or micro base stations, is one of the mechanisms that may be employed to satisfy the ever-increasing demand for more and more bandwidth and/or capacity in mobile networks mainly driven by the high adoption of video streaming services. Due to the availability of more spectrum in the millimeter wave (mmw) band, deploying small cells that operate in this band is an attractive deployment option for these purposes. However, deploying fiber to the small cells, which is the usual way in which small cells are deployed, may end up being very expensive and impractical. Thus, employing a wireless link for connecting the small cells to the operator's network is a cheaper and practical alternative. One such solution is an JAB network where the operator may utilize part of the radio resources for the backhaul link.

Integrated access and backhaul has been studied earlier in 3GPP in the scope of LTE Rel-10. In that work, an architecture was adopted where a Relay Node (RN) has the functionality of an LTE eNB and UE modem. The RN is connected to a donor eNB which has a S1/X2 proxy functionality hiding the RN from the rest of the network. That architecture enabled the Donor eNB to also be aware of the UEs behind the RN and hide any UE mobility between Donor eNB and Relay Node on the same Donor eNB from the CN.

During the Rel-10, other architectures were also considered, e.g. where the RNs are more transparent to the Donor gNB and allocated a separate standalone P/S-GW node.

For NR, similar architecture option may also be considered. One potential difference compared to LTE other than lower layer difference is that a gNB-CU/DU split is defined for NR, which allows a separation of time critical RLC/MAC/PHY protocols from less time critical RRC/PDCP protocols. Such a split may also be applied for the integrated access and backhaul case. Other differences anticipated in NR as compared to LTE with regards to IAB is the support of multiple hops as well as the support of redundant paths.

Regarding gNB-CU/DU split in NR and NG-RAN, in NR and for Next Generation RAN, it has been agreed to support a separation for the gNB into a CU and DUs. The DU terminates the radio interface towards the UE including the RLC, MAC and Physical layer protocols, while the CU terminates the PDCP and RRC protocols towards the UE as well as the NG-C/U interfaces towards 5GC and Xn/X2 interface towards other NR gNBs and LTE eNBs. The CU/DU separation is described further in 3GPP TS 38.401 and FIG. 11. Between the CU and DU, an F1 interface is defined. The F1 application part protocol (F1-AP) is defined in 3GPP 38.473.

Additionally, it has been agreed in 3GPP RAN3 WG to support a separation of the gNB-CU into a CU-CP function including RRC and PDCP for signaling radio bearers and CU-UP function including PDCP for user plane. The CU-CP and CU-UP parts communicate with each other using the E1 interface and the E1-AP protocol. The CU-CP/UP separation is illustrated in FIG. 12.

Regarding usage of EN-DC for JAB nodes, from the 3GPP RAN2 agreement, both SA and NSA in EN-DC on access link between UE and JAB node shall be supported. An example deployment for JAB using EN-DC may be a macro grid LTE network which is densified by adding new micro nodes which some are backhauled using JAB. In this example scenario, the macro sites are upgraded to also support NR which is in addition to LTE, and the micro sites only support NR as shown in FIG. 13.

In this case, it may be possible to operate in EN-DC utilizing LTE wide area coverage and NR as a data boost. The EN-DC solution allows separation of the LTE and NR using non-ideal transport, meaning that it may be feasible for the EN-DC solution to support the JAB scenario where the NR node serving the UE is wirelessly backhauled using another NR node. FIG. 14 illustrates an example logical architecture for this scenario, where the NR node being wirelessly backhauled over NR-labelled IAB node performs the functions of a en-gNB-DU serving the NR SCG link.

The existing EN-DC solution including X2 interface functions may be applicable for IAB nodes supported EN-DC UEs. No IAB-specific impact is foreseen on the LTE eNB for support EN-DC on the access link.

It is assumed integrated access and backhaul may be supported also in standalone NR deployment, for this reason it is assumed that the standard may support IAB also when using standalone NR both on the access and backhaul link to allow full NR-only deployments as shown in FIG. 15.

The standard may support IAB when using standalone NR both on the access and backhaul link. There currently exists certain challenge(s). For example, in order to support integrated access and backhauling, it is desirable to allow the IAB node, e.g. the relay node which provides access UEs and is wirelessly backhaul via NR, to operate in standalone NR. The reason for this is that it is quite complicated to support EN-DC on the backhaul link as described below.

Given that the IAB backhaul link is a network internal link, there is more flexibility how this link would need to be realized compared to the access link which needs to interwork with millions of devices and/or UEs including legacy devices. For this reason, it may be considered if EN-DC could be avoided on the backhaul link and instead only SA NR could be used.

The EN-DC on the backhaul link scenario and its high-level logical architecture are illustrated in FIGS. 13 and 14.

One argument for supporting EN-DC may be that if the rest of the network including the Packet Core do not support standalone NR, it would not be feasible to connect the IAB node using standalone NR. On the other hand, if it would be possible to avoid EN-DC even in these networks, it would be beneficial since EN-DC has some impacts to LTE eNB and EPC as shown above.

Since on the backhaul link both nodes are network nodes, it is at least easier to upgrade them to support standalone NR. Other arguments why standalone NR might be enough for the backhaul link is that it is expected that the IAB node may be deployed at a site with good NR coverage and would not require LTE from radio coverage perspective.

Another potential issue with supporting both EN-DC and SA on the backhaul link is that this requires, from standardization point of view, two different CN solutions as well as two different NAS protocols for providing connectivity functionality for the IAB node. It may also be that the solution would look different between the two CNs since the different functional splits and CP/UP separation is applied in EPC and 5GC.

A further issue with using EN-DC for the backhaul link is that most likely this means that IAB specific functionality may also be required in the LTE eNB serving the IAB node, as the functionalities needed at the LTE MN for serving the IAB node may be quite different from that needed for serving a UE. Exactly what functionalities are needed remains to be seen, but at least there may be some basic functionality related to CN selection, slicing, and the like that are not applicable to a UE.

SUMMARY

To address the foregoing problems with existing solutions, disclosed are methods, network nodes, and a communication system for enabling a relay node to operate in a non-standalone cell by barring standalone UEs from accessing the non-standalone cell but allowing the relay node to access the non-standalone cell. The present disclosure implements a solution for a relay node to perform standalone operations in a non-standalone cell, so that the relay node may support both the access and backhaul link in EN-DC without requiring operators to support standalone cells for non-standalone UEs. Therefore, the deployment of the relay nodes may avoid impacts on LTE base stations and EPC network.

Several embodiments are elaborated in this disclosure. According to one embodiment, a method for enabling operations for a relay node comprises receiving, at a first network node, a system information block including a first indication and a second indication, wherein the first indication indicates that a first cell is a non-standalone cell and whether standalone UEs are barred from accessing the first cell, and the second indication indicates whether a type of the first network node is able to access the first cell. The method further comprises identifying, at the first network node, whether the type of the first network node is able to access the first cell based on the second indication in the system information block.

In one embodiment, the first network node is able to access the first cell when the second indication indicates that the first cell is reserved but is not reserved for the type of the first network node. In another embodiment, the first network node is able to access the first cell when the second indication indicates that the first cell is reserved but set to allow the type of the first network node. In one embodiment, the first indication is reservedNR-Cell which is configured or present, and the second indication is ReservedNR-CellExceptions.

In one embodiment, the first network node is able to access the first cell when the second indication comprises a cell access list indicating that the type of the first network node is able to access the first cell. In one embodiment, the first indication is reservedNR-Cell which is configured or present, and the cell access list is included in cellAccess-RelatedInfoList.

In one embodiment, the first network node is able to access the first cell when the second indication does not comprise a barring value for the type of the first network node.

In one embodiment, the system information block further comprises a third indication which indicates that a user equipment of the standalone UEs is able to access the first cell.

In one embodiment, the method further comprises receiving, at the first network node, a second system information block, wherein the second system information block is used for standalone operations and is only read by the type of the first network node when the first cell is allowed to be accessed by the type of the first network node.

In one embodiment, the first network node performs a random access procedure to access the first cell via standalone operations, in response to identifying that the type of the first network node is able to access the first cell based on the second indication in the system information block.

According to another embodiment, a network node for enabling operations for a relay node comprises at least one processing circuitry, and at least one storage that stores processor-executable instructions, when executed by the processing circuitry, causes a network node to receive a system information block including a first indication and the second indication, wherein the first indication indicates that a first cell is a non-standalone cell and whether standalone UEs are barred from accessing the first cell, and the second indication indicates whether a type of the first network node is able to access the first cell; and identify whether the type of the first network node is able to access the first cell based on the second indication in the system information block.

According to yet another embodiment, a network node for enabling operations for a relay node comprises at least one processing circuitry; and at least one storage that stores processor-executable instructions, when executed by the processing circuitry, causes a network node to broadcast, to relay nodes and UEs in a first cell, a system information block including a first indication and the second indication, wherein the first indication indicates that the first cell is a non-standalone cell and whether standalone UEs are barred from accessing the first cell, and the second indication indicates whether the relay nodes are able to access the first cell.

According to yet another embodiment, a communication system for enabling operations for a relay node comprises at least two network nodes. A first network node comprises at least one processing circuitry configured to broadcast, to relay nodes and UEs in a first cell, a system information block including a first indication and the second indication, wherein the first indication indicates that a first cell is a non-standalone cell and whether standalone UEs are barred from accessing the first cell, and the second indication indicates whether the relay nodes are able to access the first cell. A second network node of the relay nodes comprises at least one processing circuitry configured to receive, from the first network node, the system information block including the first indication and the second indication and identify whether the first cell is allowed to be accessed by the relay nodes based on the second indication in the system information block.

Certain aspects of the present disclosure and their embodiments may provide solutions to these or other challenges. There are, proposed herein, various embodiments which address one or more of the issues disclosed herein.

Certain embodiments may provide one or more of the following technical advantages. The methods disclosed in the present disclosure may enable relay nodes, e.g. IAB nodes, to camp on and access non-standalone NR cells and operate like these non-standalone NR cells are standalone NR cells. Particular embodiments allow certain cells to operate using standalone RAT for relay nodes but still prevent standalone UEs from accessing these certain cells.

Particular embodiments further provide the operators which only support EN-DC and EPC networks to support relay nodes using standalone NR. Therefore, particular embodiments may ease impacts on LTE base stations and EPC networks and provide a cost-efficient way to upgrade the networks.

Various other features and advantages will become obvious to one of ordinary skill in the art in light of the following detailed description and drawings. Certain embodiments may have none, some, or all of the recited advantages.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
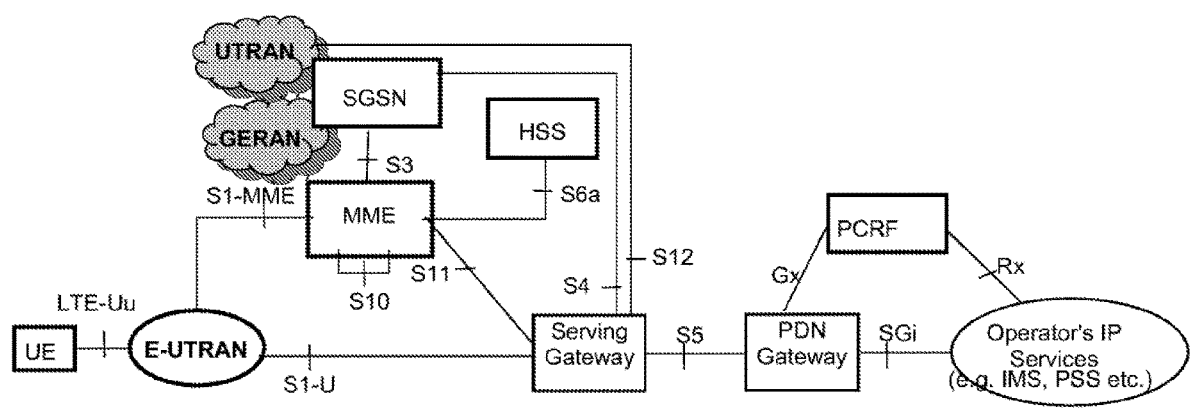
FIG. 1 illustrates an example non-roaming EPC architecture for 3GPP accesses.
Figure 2:
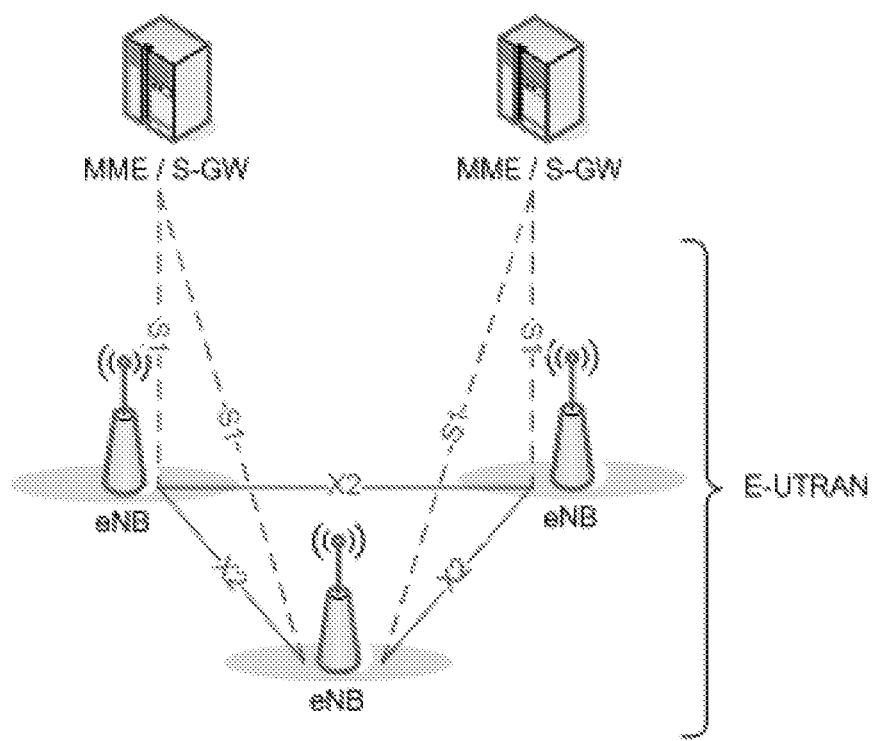
FIG. 2 illustrates an example E-UTRAN overall architecture.
Figure 3:
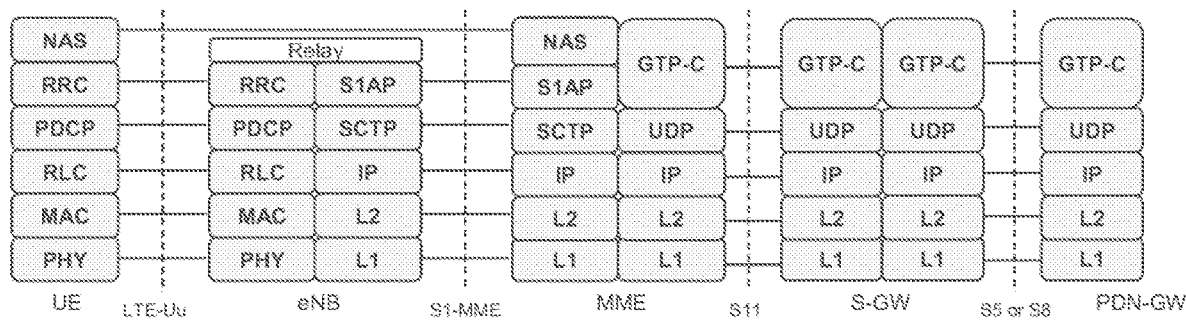
FIG. 3 illustrates an example EPC Control Plane protocol architecture.
Figure 4:
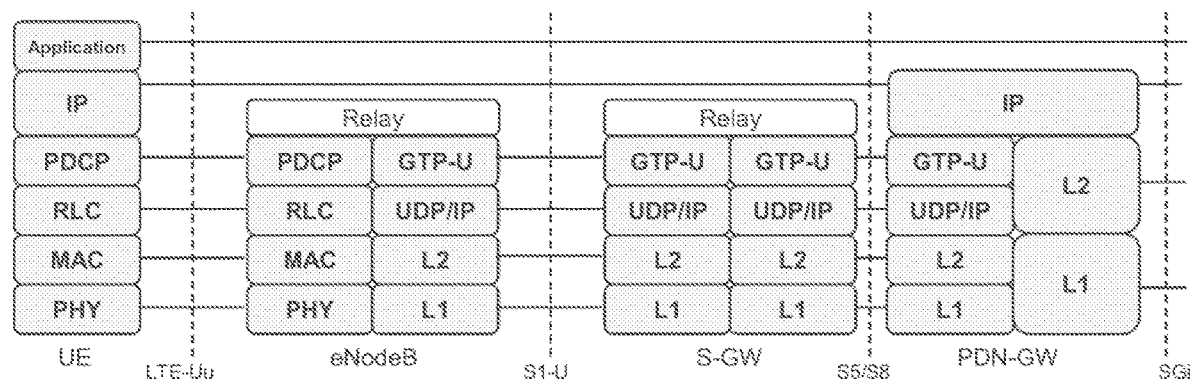
FIG. 4 illustrates an example EPC User Plane protocol architecture.
Figure 5:
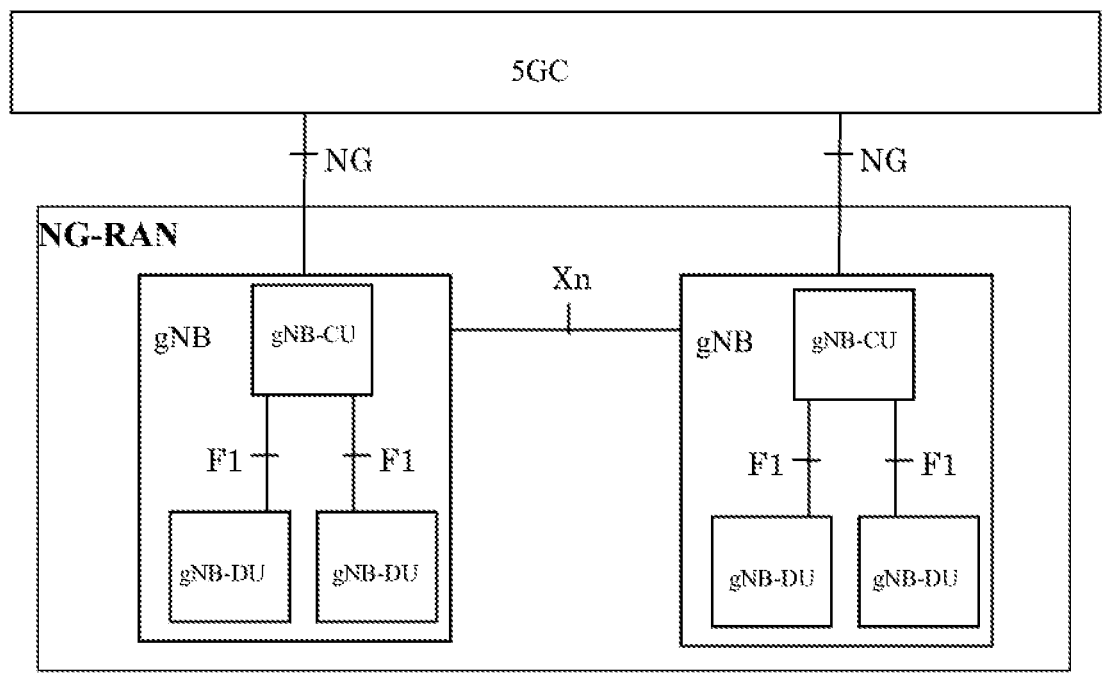
FIG. 5 illustrates an example of a current, overall 5G RAN architecture.
Figure 6:
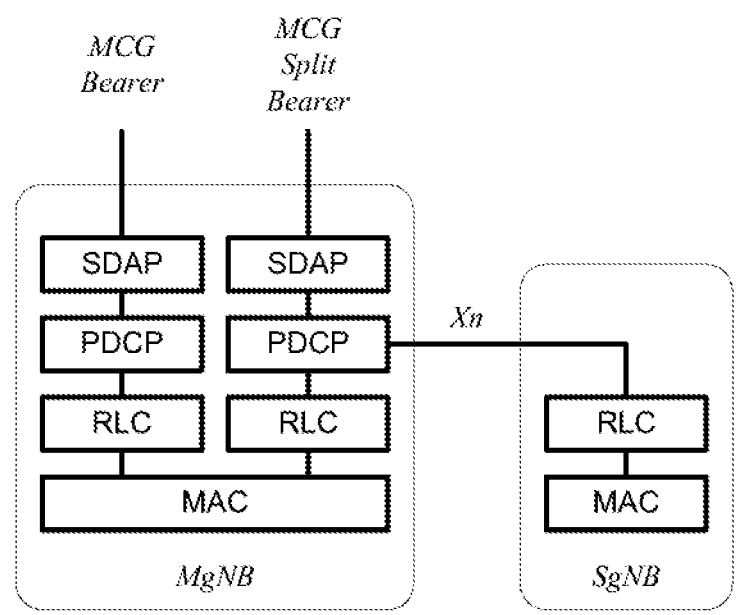
FIG. 6 illustrates example MgNB Bearers for Dual Connectivity.
Figure 7:
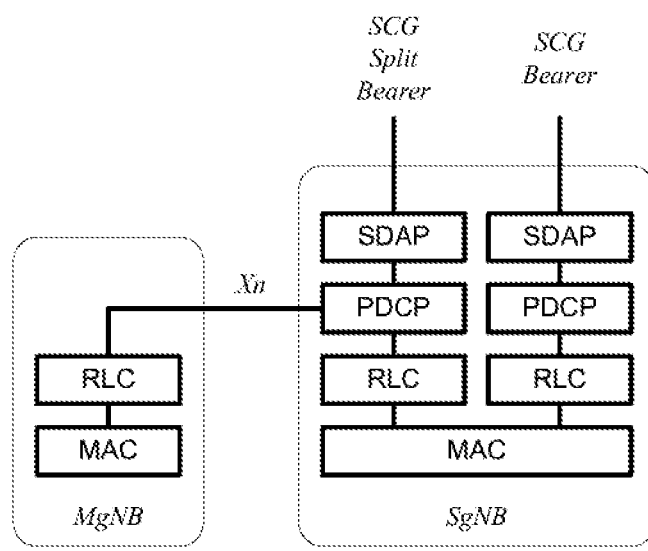
FIG. 7 illustrates example SgNB Bearers for Dual Connectivity.
Figure 8:
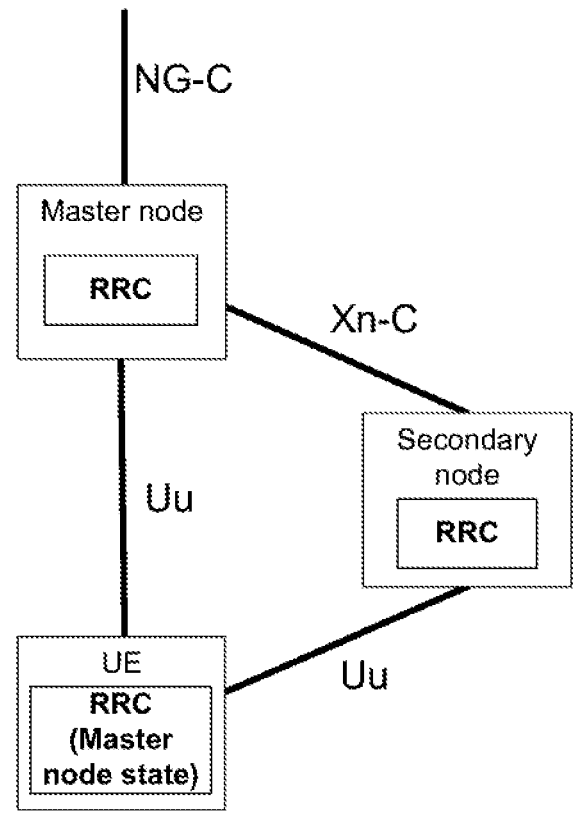
FIG. 8 illustrates example principles of MR-DC in 5G.
Figure 9:
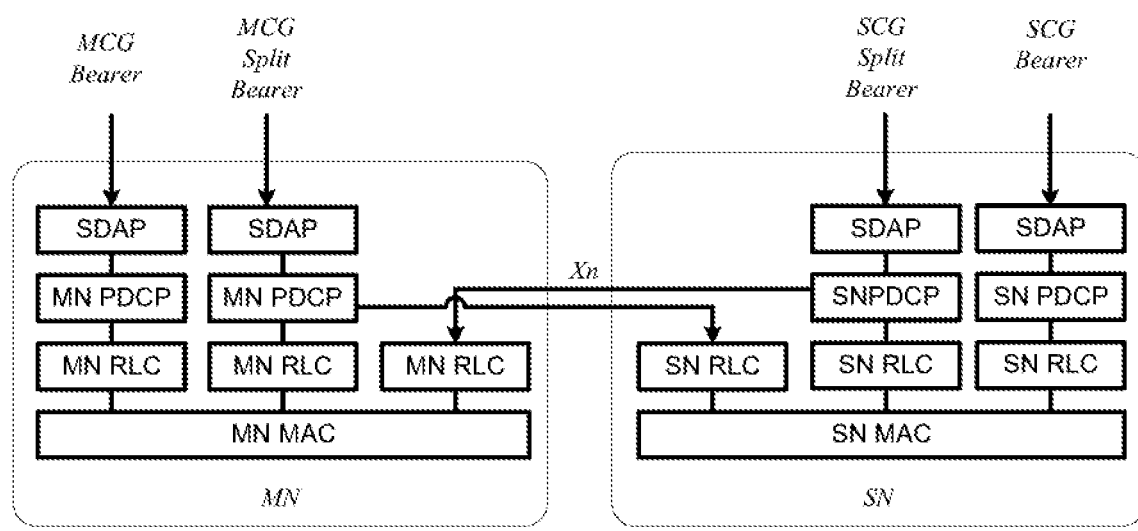
FIG. 9 illustrates an example radio protocol architecture for MGC, MCG split, SCG and SCG split bearers in MR-DC with 5GC.
Figure 10:
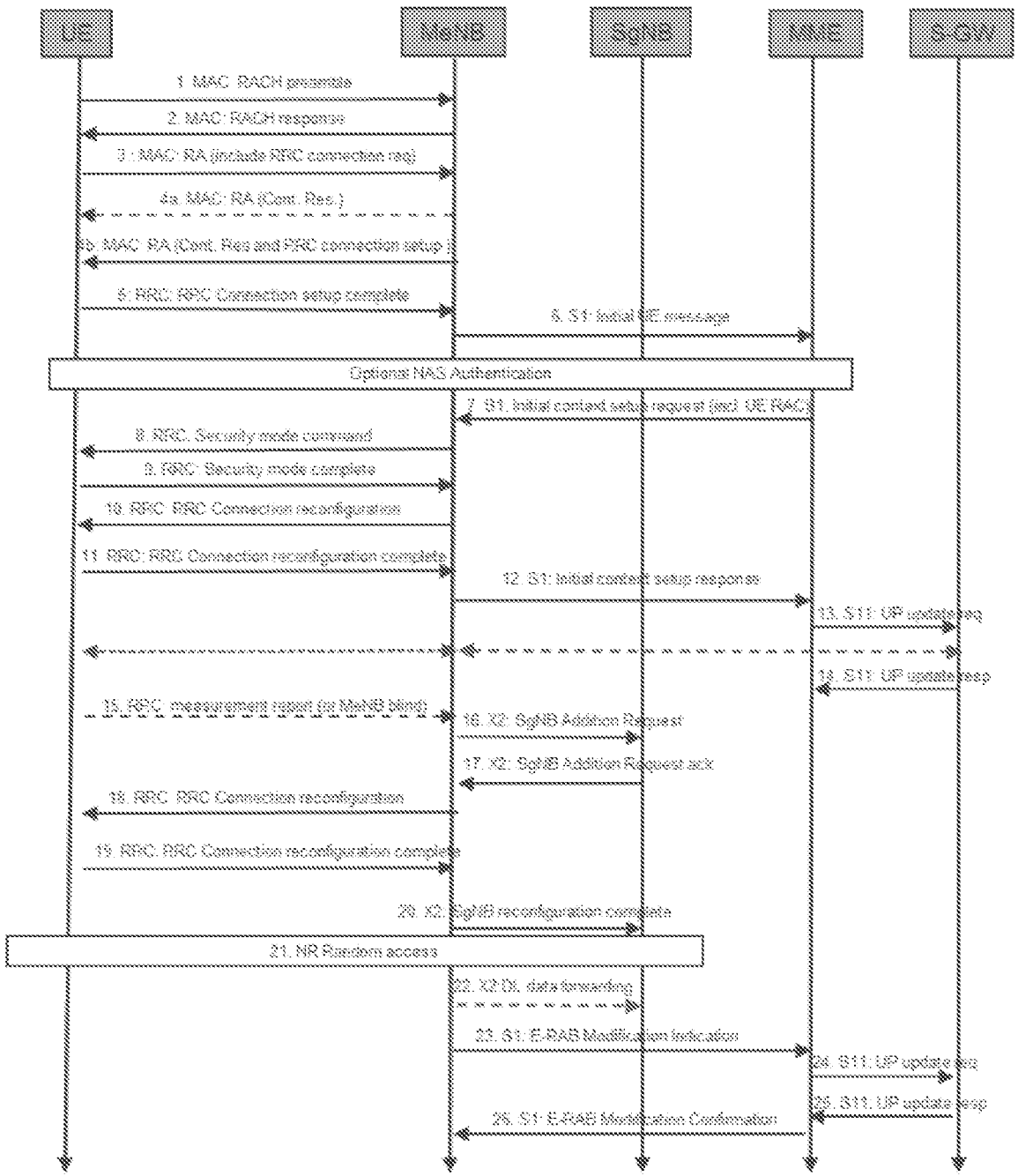
FIG. 10 illustrates an example signaling of non-standalone NR deployments.
Figure 11:
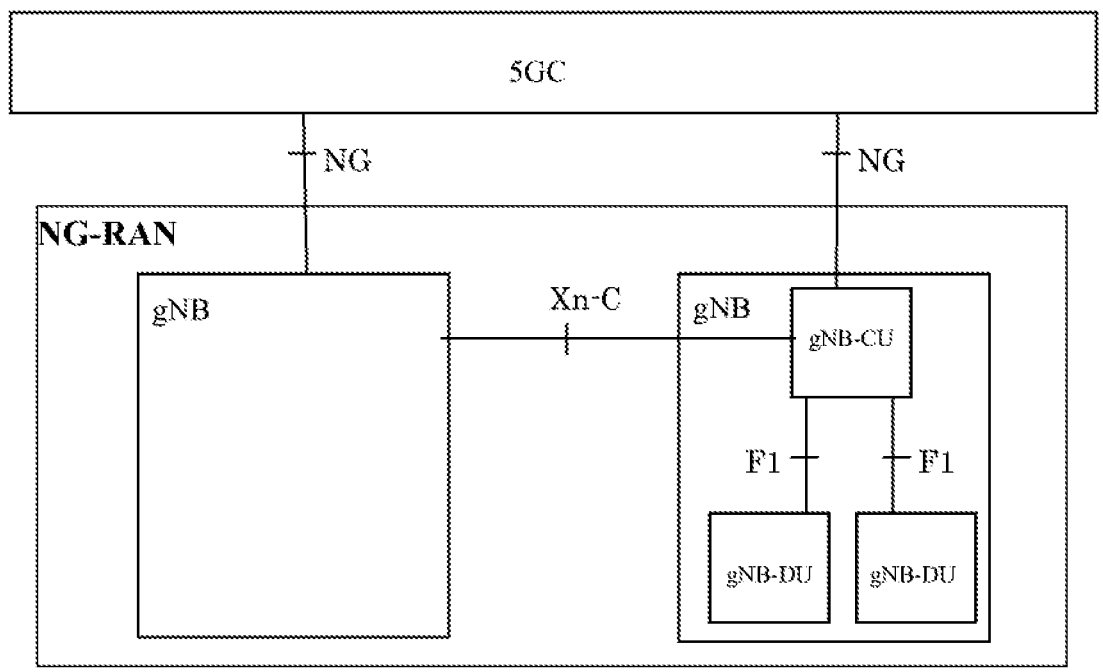
FIG. 11 illustrates a block schematic of an example CU-DU separation in a gNB.
Figure 12:
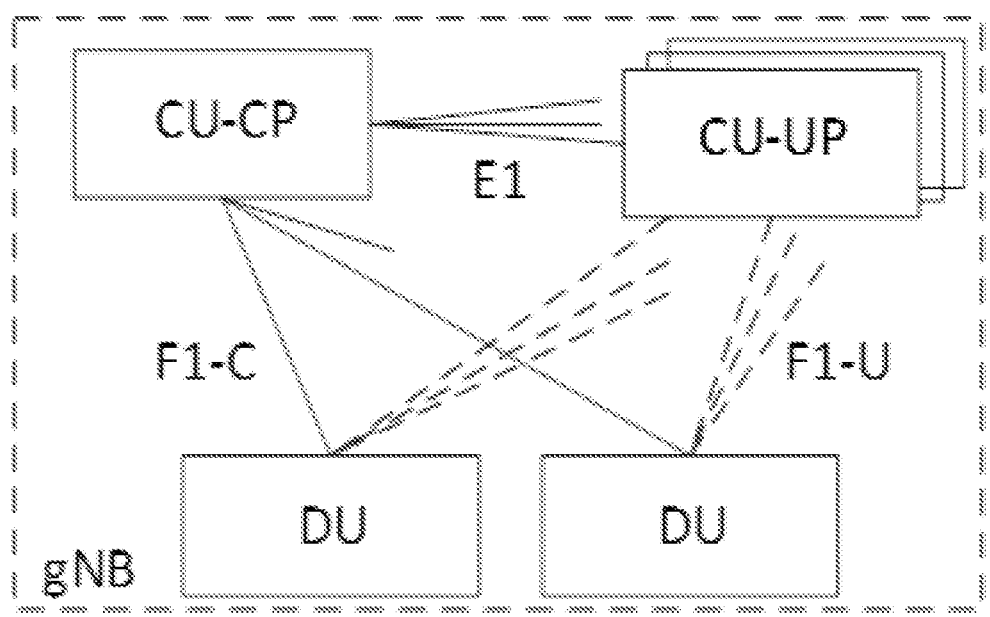
FIG. 12 illustrates an example CU-CP/CU-UP separation using E1 interface and E1-AP protocol.

As developing 5G NR network, it is critical to support legacy UEs to access EPC network via NR cells with a cost-efficient way, particular embodiments in the present application provide a method to enable JAB nodes to camp on and access non-standalone NR cells as if they were standalone. For example, particular embodiments allow a non-standalone cell to operate using standalone NR for JAB nodes but still prevents SA capable UEs from accessing the non-standalone cell. Particular embodiments provide operators which only supports EN-DC and EPC network may support JAB nodes using standalone NR.

Particular embodiments may provide a solution to utilize standalone NR for JAB nodes without requiring operators to support standalone NR for normal UEs. This avoids the need for operators which only support EN-DC for their end users UEs to use EN-DC for the JAB backhaul link which would impact their LTE base stations and EPC network. Particular embodiments avoid such impact on the LTE base stations and EPC network when deploying JAB nodes. Therefore, particular embodiments of the present disclosure may minimize a cost to upgrade the network and lead to a faster role out of JAB nodes.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In some embodiments a non-limiting term "UE" is used. The UE herein can be any type of wireless device capable of communicating with network node or another UE over radio signals. The UE may also be radio communication device, target device, device to device (D2D) UE, machine type UE or UE capable of machine to machine communication (M2M), a sensor equipped with UE, iPAD, Tablet, mobile terminals, smart phone, laptop embedded equipped (LEE), laptop mounted equipment (LME), USB dongles, Customer Premises Equipment (CPE) etc.

Also, in some embodiments, generic terminology "network node" is used. It can be any kind of network node which may comprise of a radio network node such as base station, radio base station, base transceiver station, base station controller, network controller, multi-standard radio BS, gNB, NR BS, evolved Node B (eNB), Node B, Multi-cell/multicast Coordination Entity (MCE), relay node, access point, radio access point, Remote Radio Unit (RRU) Remote Radio Head (RRH), a multi-standard BS (a.k.a. MSR BS), a core network node (e.g., MME, SON node, a coordinating node, positioning node, MDT node, etc.), or even an external node (e.g., 3rd party node, a node external to the current network), etc. The network node may also comprise a test equipment.

Furthermore, in some embodiments, the term "base station (BS)" may comprise, e.g., gNB, en-gNB or ng-eNB or a relay node, or any BS compliant with the embodiments. The term "radio node" used herein may be used to denote a UE or a radio network node. The term "signaling" used herein may comprise any of high-layer signaling (e.g., via RRC or a like), lower-layer signaling (e.g., via a physical control channel or a broadcast channel), or a combination thereof. The signaling may be implicit or explicit. The signaling may further be unicast, multicast or broadcast. The signaling may also be directly to another node or via a third node.

Figure 16:
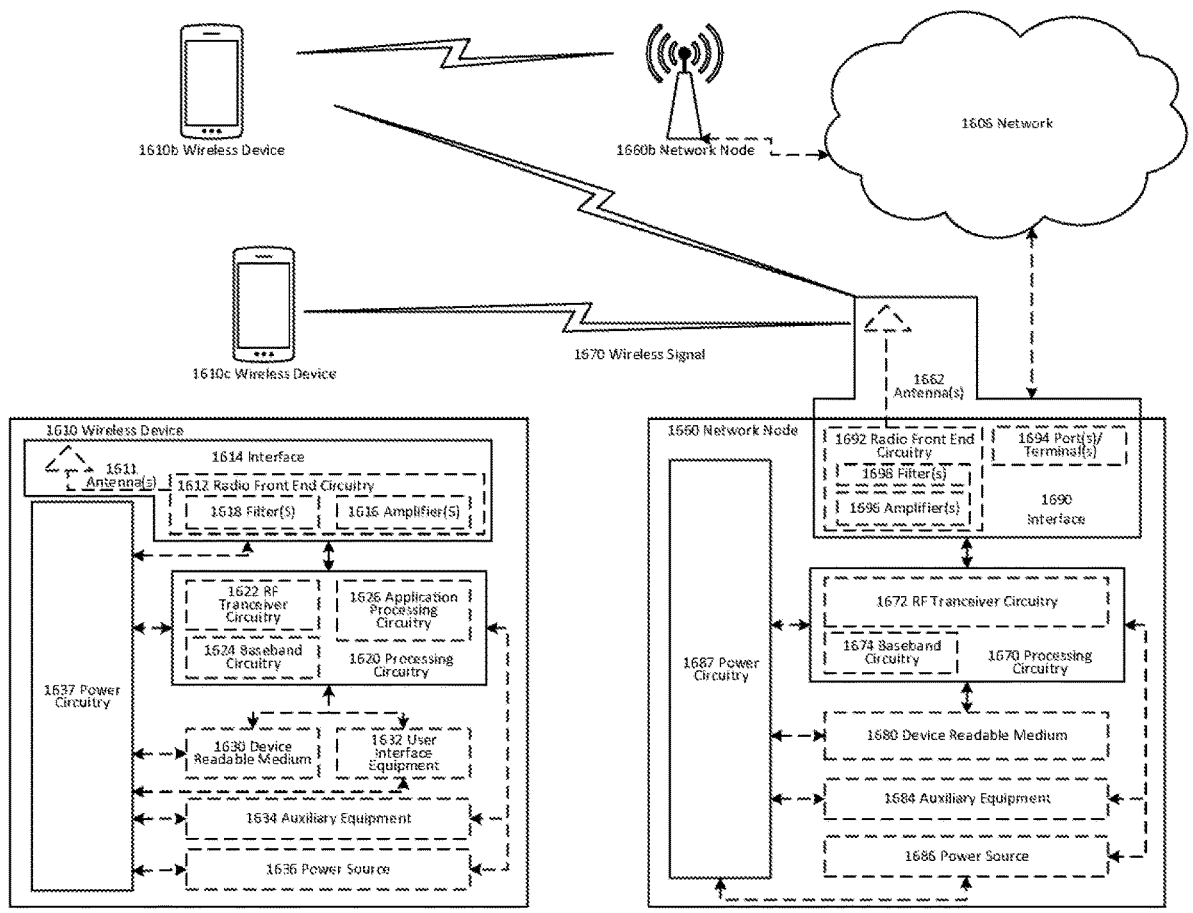
FIG. 16 illustrates an example wireless network, according to certain embodiments.

FIG. 16 is an example wireless network, in accordance with certain embodiments. Although the subject matter described herein may be implemented in any appropriate type of system using any suitable components, the embodiments disclosed herein are described in relation to a wireless network, such as the example wireless network illustrated in FIG. 16. For simplicity, the wireless network of FIG. 16 only depicts network 1606, network nodes 1660 and 1660b, and wireless devices (WDs) 1610, 1610b, and 1610c. In practice, a wireless network may further include any additional elements suitable to support communication between wireless devices or between a wireless device and another communication device, such as a landline telephone, a service provider, or any other network node or end device. Of the illustrated components, network node 1660 and wireless device (WD) 1610 are depicted with additional detail. In some embodiments, the network node 1660 may be a base station, such as gNB. In certain embodiments, the network node 1660 may be a network node, which is further illustrated in FIG. 27. The wireless network may provide communication and other types of services to one or more wireless devices to facilitate the wireless devices' access and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/ or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1606 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1660 and WD 1610 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access the wireless network or to provide some service to a wireless device that has accessed the wireless network.

In FIG. 16, network node 1660 includes processing circuitry 1670, device readable medium 1680, interface 1690, auxiliary equipment 1688, power source 1686, power circuitry 1687, and antenna 1662. Although network node 1660 illustrated in the example wireless network of FIG. 16 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1660 are depicted as single boxes located within a larger box, or nested within multiple boxes, in practice, a network node may comprise multiple different physical components that make up a single illustrated component (e.g., device readable medium 1680 may comprise multiple separate hard drives as well as multiple RAM modules).

Similarly, network node 1660 may be composed of multiple physically separate components (e.g., a NodeB component and a RNC component, or a BTS component and a BSC component, etc.), which may each have their own respective components. In certain scenarios in which network node 1660 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, network node 1660 may be configured to support multiple radio access technologies (RATs). In such embodiments, some components may be duplicated (e.g., separate device readable medium 1680 for the different RATs) and some components may be reused (e.g., the same antenna 1662 may be shared by the RATs). Network node 1660 may also include multiple sets of the various illustrated components for different wireless technologies integrated into network node 1660, such as, for example, GSM, WCDMA, LTE, NR, WiFi, or Bluetooth wireless technologies. These wireless technologies may be integrated into the same or different chip or set of chips and other components within network node 1660.

Processing circuitry 1670 is configured to perform any determining, calculating, or similar operations (e.g., certain obtaining operations) described herein as being provided by a network node. These operations performed by processing circuitry 1670 may include processing information obtained by processing circuitry 1670 by, for example, converting the obtained information into other information, comparing the obtained information or converted information to information stored in the network node, and/or performing one or more operations based on the obtained information or converted information, and as a result of said processing making a determination.

Processing circuitry 1670 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1660 components, such as device readable medium 1680, network node 1660 functionality. For example, processing circuitry 1670 may execute instructions stored in device readable medium 1680 or in memory within processing circuitry 1670. Such functionality may include providing any of the various wireless features, functions, or benefits discussed herein. In some embodiments, processing circuitry 1670 may include a system on a chip (SOC).

In some embodiments, processing circuitry 1670 may include one or more of radio frequency (RF) transceiver circuitry 1672 and baseband processing circuitry 1674. In some embodiments, radio frequency (RF) transceiver circuitry 1672 and baseband processing circuitry 1674 may be on separate chips (or sets of chips), boards, or units, such as radio units and digital units. In alternative embodiments, part or all of RF transceiver circuitry 1672 and baseband processing circuitry 1674 may be on the same chip or set of chips, boards, or units In certain embodiments, some or all of the functionality described herein as being provided by a network node, base station, eNB or other such network device may be performed by processing circuitry 1670 executing instructions stored on device readable medium 1680 or memory within processing circuitry 1670. In alternative embodiments, some or all of the functionality may be provided by processing circuitry 1670 without executing instructions stored on a separate or discrete device readable medium, such as in a hard-wired manner. In any of those embodiments, whether executing instructions stored on a device readable storage medium or not, processing circuitry 1670 can be configured to perform the described functionality. The benefits provided by such functionality are not limited to processing circuitry 1670 alone or to other components of network node 1660, but are enjoyed by network node 1660 as a whole, and/or by end users and the wireless network generally.

Device readable medium 1680 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1670. Device readable medium 1680 may store any suitable instructions, data or information, including a computer program, software, an application including one or more of logic, rules, code, tables, etc. and/or other instructions capable of being executed by processing circuitry 1670 and, utilized by network node 1660. Device readable medium 1680 may be used to store any calculations made by processing circuitry 1670 and/or any data received via interface 1690. In some embodiments, processing circuitry 1670 and device readable medium 1680 may be considered to be integrated.

Interface 1690 is used in the wired or wireless communication of signaling and/or data between network node 1660, network 1606, and/or WDs 1610. As illustrated, interface 1690 comprises port(s)/terminal(s) 1694 to send and receive data, for example to and from network 1606 over a wired connection. Interface 1690 also includes radio front end circuitry 1692 that may be coupled to, or in certain embodiments a part of, antenna 1662. Radio front end circuitry 1692 comprises filters 1698 and amplifiers 1696. Radio front end circuitry 1692 may be connected to antenna 1662 and processing circuitry 1670. Radio front end circuitry may be configured to condition signals communicated between antenna 1662 and processing circuitry 1670. Radio front end circuitry 1692 may receive digital data that is to be sent out to other network nodes or WDs via a wireless connection. Radio front end circuitry 1692 may convert the digital data into a radio signal having the appropriate channel and bandwidth parameters using a combination of filters 1698 and/or amplifiers 1696. The radio signal may then be transmitted via antenna 1662. Similarly, when receiving data, antenna 1662 may collect radio signals which are then converted into digital data by radio front end circuitry 1692. The digital data may be passed to processing circuitry 1670. In other embodiments, the interface may comprise different components and/or different combinations of components.

In certain alternative embodiments, network node 1660 may not include separate radio front end circuitry 1692, instead, processing circuitry 1670 may comprise radio front end circuitry and may be connected to antenna 1662 without separate radio front end circuitry 1692. Similarly, in some embodiments, all or some of RF transceiver circuitry 1672 may be considered a part of interface 1690. In still other embodiments, interface 1690 may include one or more ports or terminals 1694, radio front end circuitry 1692, and RF transceiver circuitry 1672, as part of a radio unit (not shown), and interface 1690 may communicate with baseband processing circuitry 1674, which is part of a digital unit (not shown).

Antenna 1662 may include one or more antennas, or antenna arrays, configured to send and/or receive wireless signals. Antenna 1662 may be coupled to radio front end circuitry 1690 and may be any type of antenna capable of transmitting and receiving data and/or signals wirelessly. In some embodiments, antenna 1662 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1662 may be separate from network node 1660 and may be connectable to network node 1660 through an interface or port.

Antenna 1662, interface 1690, and/or processing circuitry 1670 may be configured to perform any receiving operations and/or certain obtaining operations described herein as being performed by a network node. Any information, data and/or signals may be received from a wireless device, another network node and/or any other network equipment. Similarly, antenna 1662, interface 1690, and/or processing circuitry 1670 may be configured to perform any transmitting operations described herein as being performed by a network node. Any information, data and/or signals may be transmitted to a wireless device, another network node and/or any other network equipment.

Power circuitry 1687 may comprise, or be coupled to, power management circuitry and is configured to supply the components of network node 1660 with power for performing the functionality described herein. Power circuitry 1687 may receive power from power source 1686. Power source 1686 and/or power circuitry 1687 may be configured to provide power to the various components of network node 1660 in a form suitable for the respective components (e.g., at a voltage and current level needed for each respective component). Power source 1686 may either be included in, or external to, power circuitry 1687 and/or network node 1660. For example, network node 1660 may be connectable to an external power source (e.g., an electricity outlet) via an input circuitry or interface such as an electrical cable, whereby the external power source supplies power to power circuitry 1687. As a further example, power source 1686 may comprise a source of power in the form of a battery or battery pack which is connected to, or integrated in, power circuitry 1687. The battery may provide backup power should the external power source fail. Other types of power sources, such as photovoltaic devices, may also be used.

Alternative embodiments of network node 1660 may include additional components beyond those shown in FIG. 16 that may be responsible for providing certain aspects of the network node's functionality, including any of the functionality described herein and/or any functionality necessary to support the subject matter described herein. For example, network node 1660 may include user interface equipment to allow input of information into network node 1660 and to allow output of information from network node 1660. This may allow a user to perform diagnostic, maintenance, repair, and other administrative functions for network node 1660.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). In certain embodiments, the wireless device 1610 may be a user equipment which is further depicted in FIG. 18. Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1610 includes antenna 1611, interface 1614, processing circuitry 1620, device readable medium 1630, user interface equipment 1632, auxiliary equipment 1634, power source 1636 and power circuitry 1637. WD 1610 may include multiple sets of one or more of the illustrated components for different wireless technologies supported by WD 1610, such as, for example, GSM, WCDMA, LTE, NR, WiFi, WiMAX, or Bluetooth wireless technologies, just to mention a few. These wireless technologies may be integrated into the same or different chips or set of chips as other components within WD 1610.

Antenna 1611 may include one or more antennas or antenna arrays, configured to send and/or receive wireless signals, and is connected to interface 1614. In certain alternative embodiments, antenna 1611 may be separate from WD 1610 and be connectable to WD 1610 through an interface or port. Antenna 1611, interface 1614, and/or processing circuitry 1620 may be configured to perform any receiving or transmitting operations described herein as being performed by a WD. Any information, data and/or signals may be received from a network node and/or another WD. In some embodiments, radio front end circuitry and/or antenna 1611 may be considered an interface.

As illustrated, interface 1614 comprises radio front end circuitry 1612 and antenna 1611. Radio front end circuitry 1612 comprise one or more filters 1618 and amplifiers 1616. Radio front end circuitry 1614 is connected to antenna 1611 and processing circuitry 1620, and is configured to condition signals communicated between antenna 1611 and processing circuitry 1620. Radio front end circuitry 1612 may be coupled to or a part of antenna 1611. In some embodiments, WD 1610 may not include separate radio front end circuitry 1612; rather, processing circuitry 1620 may comprise radio front end circuitry and may be connected to antenna 1611. Similarly, in some embodiments, some or all of RF transceiver circuitry 1622 may be considered a part of interface 1614. Radio front end circuitry 1612 may receive digital data that is to be sent out to other network nodes or WDs via a wireless connection. Radio front end circuitry 1612 may convert the digital data into a radio signal having the appropriate channel and bandwidth parameters using a combination of filters 1618 and/or amplifiers 1616. The radio signal may then be transmitted via antenna 1611. Similarly, when receiving data, antenna 1611 may collect radio signals which are then converted into digital data by radio front end circuitry 1612. The digital data may be passed to processing circuitry 1620. In other embodiments, the interface may comprise different components and/or different combinations of components.

Processing circuitry 1620 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1610 components, such as device readable medium 1630, WD 1610 functionality. Such functionality may include providing any of the various wireless features or benefits discussed herein. For example, processing circuitry 1620 may execute instructions stored in device readable medium 1630 or in memory within processing circuitry 1620 to provide the functionality disclosed herein.

As illustrated, processing circuitry 1620 includes one or more of RF transceiver circuitry 1622, baseband processing circuitry 1624, and application processing circuitry 1626. In other embodiments, the processing circuitry may comprise different components and/or different combinations of components. In certain embodiments processing circuitry 1620 of WD 1610 may comprise a SOC. In some embodiments, RF transceiver circuitry 1622, baseband processing circuitry 1624, and application processing circuitry 1626 may be on separate chips or sets of chips. In alternative embodiments, part or all of baseband processing circuitry 1624 and application processing circuitry 1626 may be combined into one chip or set of chips, and RF transceiver circuitry 1622 may be on a separate chip or set of chips. In still alternative embodiments, part or all of RF transceiver circuitry 1622 and baseband processing circuitry 1624 may be on the same chip or set of chips, and application processing circuitry 1626 may be on a separate chip or set of chips. In yet other alternative embodiments, part or all of RF transceiver circuitry 1622, baseband processing circuitry 1624, and application processing circuitry 1626 may be combined in the same chip or set of chips. In some embodiments, RF transceiver circuitry 1622 may be a part of interface 1614. RF transceiver circuitry 1622 may condition RF signals for processing circuitry 1620.

In certain embodiments, some or all of the functionalities described herein as being performed by a WD may be provided by processing circuitry 1620 executing instructions stored on device readable medium 1630, which in certain embodiments may be a computer-readable storage medium. In alternative embodiments, some or all of the functionality may be provided by processing circuitry 1620 without executing instructions stored on a separate or discrete device readable storage medium, such as in a hard-wired manner. In any of those particular embodiments, whether executing instructions stored on a device readable storage medium or not, processing circuitry 1620 can be configured to perform the described functionality. The benefits provided by such functionality are not limited to processing circuitry 1620 alone or to other components of WD 1610, but are enjoyed by WD 1610 as a whole, and/or by end users and the wireless network generally.

Processing circuitry 1620 may be configured to perform any determining, calculating, or similar operations (e.g., certain obtaining operations) described herein as being performed by a WD. These operations, as performed by processing circuitry 1620, may include processing information obtained by processing circuitry 1620 by, for example, converting the obtained information into other information, comparing the obtained information or converted information to information stored by WD 1610, and/or performing one or more operations based on the obtained information or converted information, and as a result of said processing making a determination.

Device readable medium 1630 may be operable to store a computer program, software, an application including one or more of logic, rules, code, tables, etc. and/or other instructions capable of being executed by processing circuitry 1620. Device readable medium 1630 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1620. In some embodiments, processing circuitry 1620 and device readable medium 1630 may be considered to be integrated.

User interface equipment 1632 may provide components that allow for a human user to interact with WD 1610. Such interaction may be of many forms, such as visual, audial, tactile, etc. User interface equipment 1632 may be operable to produce output to the user and to allow the user to provide input to WD 1610. The type of interaction may vary depending on the type of user interface equipment 1632 installed in WD 1610. For example, if WD 1610 is a smart phone, the interaction may be via a touch screen; if WD 1610 is a smart meter, the interaction may be through a screen that provides usage (e.g., the number of gallons used) or a speaker that provides an audible alert (e.g., if smoke is detected). User interface equipment 1632 may include input interfaces, devices and circuits, and output interfaces, devices and circuits. User interface equipment 1632 is configured to allow input of information into WD 1610, and is connected to processing circuitry 1620 to allow processing circuitry 1620 to process the input information. User interface equipment 1632 may include, for example, a microphone, a proximity or other sensor, keys/buttons, a touch display, one or more cameras, a USB port, or other input circuitry. User interface equipment 1632 is also configured to allow output of information from WD 1610, and to allow processing circuitry 1620 to output information from WD 1610. User interface equipment 1632 may include, for example, a speaker, a display, vibrating circuitry, a USB port, a headphone interface, or other output circuitry. Using one or more input and output interfaces, devices, and circuits, of user interface equipment 1632, WD 1610 may communicate with end users and/or the wireless network, and allow them to benefit from the functionality described herein.

Auxiliary equipment 1634 is operable to provide more specific functionality which may not be generally performed by WDs. This may comprise specialized sensors for doing measurements for various purposes, interfaces for additional types of communication such as wired communications etc. The inclusion and type of components of auxiliary equipment 1634 may vary depending on the embodiment and/or scenario.

Power source 1636 may, in some embodiments, be in the form of a battery or battery pack. Other types of power sources, such as an external power source (e.g., an electricity outlet), photovoltaic devices or power cells, may also be used. WD 1610 may further comprise power circuitry 1637 for delivering power from power source 1636 to the various parts of WD 1610 which need power from power source 1636 to carry out any functionality described or indicated herein. Power circuitry 1637 may in certain embodiments comprise power management circuitry. Power circuitry 1637 may additionally or alternatively be operable to receive power from an external power source; in which case WD 1610 may be connectable to the external power source (such as an electricity outlet) via input circuitry or an interface such as an electrical power cable. Power circuitry 1637 may also in certain embodiments be operable to deliver power from an external power source to power source 1636. This may be, for example, for the charging of power source 1636. Power circuitry 1637 may perform any formatting, converting, or other modification to the power from power source 1636 to make the power suitable for the respective components of WD 1610 to which power is supplied.

In EN-DC, the NR cell will broadcast a master information block (MIB) enabling the UE to find the right NR cell to operate in EN-DC. The NR cell may also broadcast a system information block element (SIB1). In order to prevent any NR SA capable UEs from camping or accessing the NR NSA cell, the cell may be barred for all UEs. Several embodiments are described as follows.

According to a first embodiment, the SIB1 includes an indication that the cell is barred. All NR SA capable UEs will read this indication an avoid camping or accessing this cell. In order for IAB nodes which are capable of SA NR operation to be able to access this cell, i.e. the cell that normal UEs are barred from, using SA NR, an additional indication in SIB1 is introduced telling JAB nodes that they can still access the cell using SA NR. The additional indication is illustrated as Table 1 below.

TABLE 1

| SIB1 of the first embodiment |
|---|
| SIB1 ::= SEQUENCE {<br>-- Unrelated parts removed<br>    cellAccessRelatedInfoList    CellAccessRelatedInfoList,<br>-- Unrelated parts removed<br>}<br>cellAccessRelatedInfoList ::= SEQUENCE (SIZE (1..MaxPLMN)) OF {<br>    plmn-IdentityList    PLMN-IdentityList,<br>    trackingAreaCode    TrackingAreaCode,<br>    ranAreaCode    RanAreaCode<br>        OPTIONAL,<br>    cellIdentity    CellIdentity,<br>    -- If the reserveNR-Cell is provided, the cell shall be considered reserved,<br>    -- unless an exception applicable for the UE or IAB node is provided in<br>reservedNrCellExceptions<br>    reservedNR-Cell    ENUMERATED {reserved}<br>        OPTIONAL,<br>    reservedNR-CellExceptions    ReservedNR-CellExceptions<br>        OPTIONAL,<br>}<br>ReservedNR-CellExceptions ::= SEQUENCE {<br>    cellReservedForIABnodes ENUMERATED {reserved}<br>        OPTIONAL,<br>    ...<br>}|

Note that in the coding above, the term Reserved is used. Reserved here does not mean that the group of UEs that are indicate reserved are allowed to access the cell, rather it is the opposite that these UEs are not allowed to access the cell. This is to adapt to legacy 3GPP terminology.

Therefore, in this case, the IAB node will acquire the SIB1 from the NR cell broadcast channel. It will decode the SIB and see if the cell is reserved. For example, reservedNR-Cell is present indicating reserved. Reserved here means that normal UEs are not allowed to access the cell.

If the cell is not reserved, for example, reservedNR-Cell is not configured or present, it means that the IAB node as well as other UEs can access the cell.

If the cell is reserved, for example, reservedNR-Cell is configured, the IAB node will further check the ReservedNR-CellExceptions structure to see if the cell is also reserved for IAB nodes, meaning that the cellReservedForIABnodes Information Element (IE) inside the ReservedNR-CellExceptions is present or set to reserved. If it is, the IAB node will not access the cell, but if the cell is not reserved for IAB nodes, meaning that the cellReservedForIABnodes is not present, the IAB node can access the cell.

According to a second embodiment, an alternative coding for the same behavior is shown in Table 2 below.

TABLE 2

SIB1 of the second embodiment

```
SIB1 ::=    SEQUENCE {
-- Unrelated parts removed
        cellAccessRelatedInfoList           CellAccessRelatedInfoList,
-- Unrelated parts removed
}
cellAccessRelatedInfoList ::= SEQUENCE (SIZE (1..MaxPLMN)) OF {
        plmn-IdentityList                   PLMN-IdentityList,
        trackingAreaCode                    TrackingAreaCode,
        ranAreaCode                         RanAreaCode
                                            OPTIONAL,
        cellIdentity                        CellIdentity,
        -- If the reservedNR-Cell is provided, the cell shall be considered reserved,
        -- unless an exception applicable for the UE or IAB node is provided in
reservedNrCellExceptions
        reservedNR-Cell                     ENUMERATED {reserved}
                OPTIONAL,
        reservedNR-CellExceptions    ReservedNR-CellExceptions
                OPTIONAL,
}
ReservedNR-CellExceptions ::= SEQUENCE {
        cellReservedForIABnodes ENUMERATED {allowed}
                OPTIONAL,
        ...
}
```

In this case using the alternative coding, it is assumed that the if reservedNR-Cell is reserved, then the IAB node will check ReservedNR-CellExceptions to see if it is still allowed to access the cell, meaning that cellReservedForIABnodes is present and set to allowed. If that is the case, the IAB node can access the cell. Otherwise, the IAB node will not be able to access the cell, which means that cellReservedForIABnodes is not present.

According to a third embodiment, SIB1 in the first and second embodiments above also work in the case that there are other reservations or allowances. The reservation and allowance will be handled independently, meaning that, for instance, the IAB nodes will only consider the IE related to them and does not need to read, decode or handle other IEs. An example for the reservation case is shown in Table 3 below, where information about other group of UEs is also included in the ReservedNR-CellExceptions list.

TABLE 3

SIB1 of the third embodiment

```
SIB1 ::=   SEQUENCE {
-- Unrelated parts removed
        cellAccessRelatedInfoList         CellAccessRelatedInfoList,
-- Unrelated parts removed
}
cellAccessRelatedInfoList ::= SEQUENCE (SIZE (1..MaxPLMN)) OF {
        plmn-IdentityList                  PLMN-Identity List,
        trackingAreaCode                   TrackingAreaCode,
        ranAreaCode                        RanAreaCode          OPTIONAL,
```

TABLE 3-continued

| SIB1 of the third embodiment | | | |
|---|---|---|---|
| cellIdentity | CellIdentity, | | |
| -- If the reservedNR-Cell is provided, the cell shall be considered reserved, | | | |
| -- unless an exception applicable for the UE is provided in reservedNrCellExceptions | | | |
| reservedNR-Cell | ENUMERATED {reserved} | OPTIONAL, | |
| reservedNR-CellExceptions | ReservedNR-CellExceptions | OPTIONAL, | |
| } | | | |
| ReservedNR-CellExceptions ::= SEQUENCE { | | | |
| cellReservedForOperatorUse | ENUMERATED | {reserved} OPTIONAL, | |
| ... | | | |
| cellReservedForIABnodes ENUMERATED {reserved} | | OPTIONAL | |
| } | | | |

According to a fourth embodiment, a simpler solution is instead of having a list of reservations or allowances, to indicate the reservation or allowance of the IAB node directly in the main cellAccessRelatedInfoList. An example SIB1 for the fourth embodiment is shown in Table 4 below.

TABLE 4

| SIB1 of the fourth embodiment | | |
|---|---|---|
| SIB1 ::= SEQUENCE { | | |
| -- Unrelated parts removed | | |
| cellAccessRelatedInfoList | CellAccessRelatedInfoList, | |
| -- Unrelated parts removed | | |
| } | | |
| cellAccessRelatedInfoList ::= SEQUENCE (SIZE (1..MaxPLMN)) OF { | | |
| plmn-IdentityList | PLMN-Identity List, | |
| trackingAreaCode | TrackingAreaCode, | |
| ranAreaCode | RanAreaCode | OPTIONAL, |
| cellIdentity | CellIdentity, | |
| -- If the reservedNR-Cell is provided, the cell shall be considered reserved, | | |
| -- unless an exception applicable for the UE is provided in reservedNrCellExceptions | | |
| reservedNR-Cell | ENUMERATED {reserved} | OPTIONAL, |
| IABnodes | ENUMERATED | {reserved,allowed} OPTIONAL, |
| } | | |

All embodiments described above allow the operator to broadcast additional SIBs used for NR standalone operation. In case that the cell is only allowed to be accessed by IAB nodes, i.e. reserved for other UEs, those SIBs will only be read by IAB node.

Figure 17:
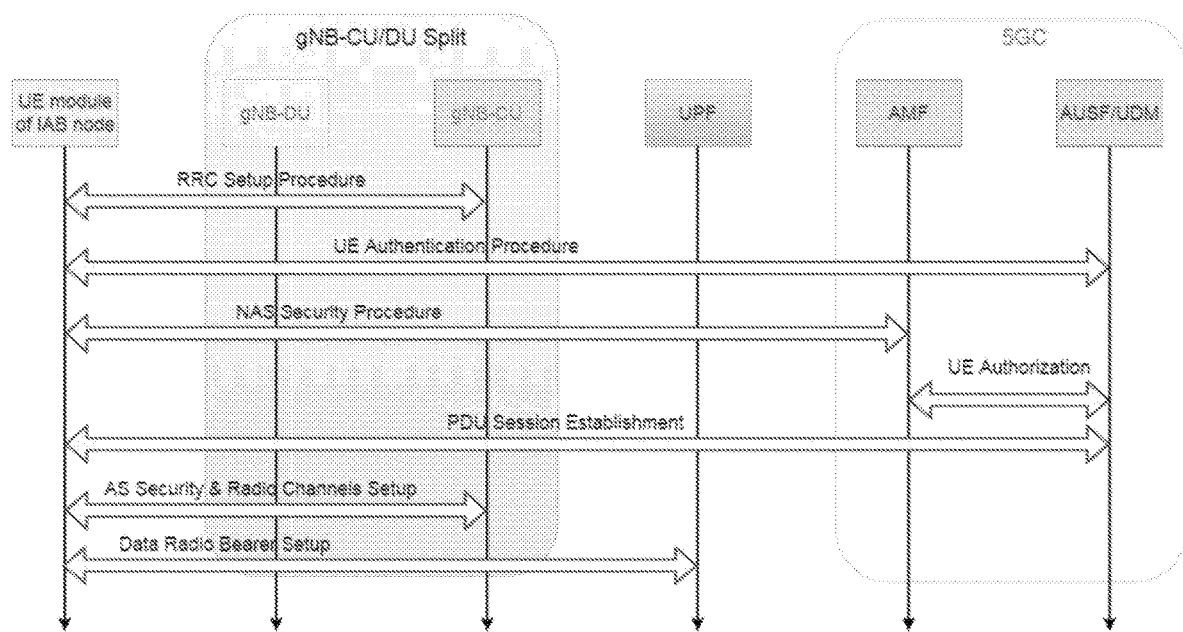
FIG. 17 illustrates example signaling of a IAB node performing a random access procedure, according to certain embodiments.

To access the NR cell in standalone mode, the IAB node will perform a random access procedure and then send RRC signaling as illustrated in FIG. 17. After sending the RRC signaling, it will authenticate itself to a 5GC core network. It will also setup a PDU session to a 5GC user plane function (UPF) to achieve IP connectivity. The 5GC network may be a dedicated 5GC instance to serve IAB nodes, or it may be a 5GC network also serving other UEs in the case of SA NR being supported also for UEs.

Figure 18:
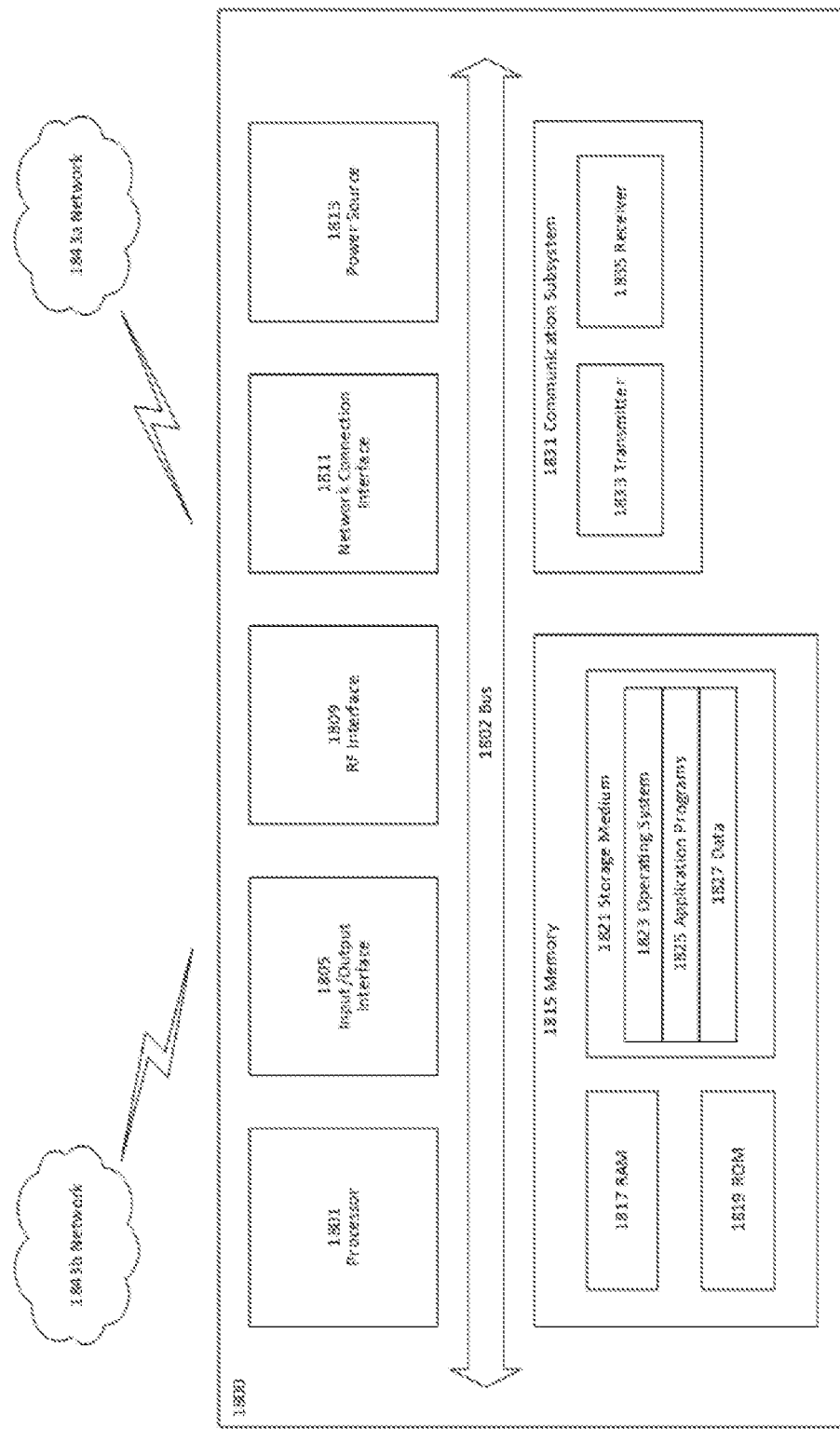
FIG. 18 illustrates an example user equipment, according to certain embodiments.

FIG. 18 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 1800 may be any UE identified by the 3rd Generation Partnership Project (3GPP), including a NB-IoT UE, a MTC UE, and/or an enhanced MTC (eMTC) UE. UE 1800, as illustrated in FIG. 18, is one example of a WD configured for communication in accordance with one or more communication standards promulgated by the 3rd Generation Partnership Project (3GPP), such as 3GPP's GSM, UNITS, LTE, and/or 5G standards. As mentioned previously, the term WD and UE may be used interchangeable. Accordingly, although FIG. 18 is a UE, the components discussed herein are equally applicable to a WD, and vice-versa.

In FIG. 18, UE 1800 includes processing circuitry 1801 that is operatively coupled to input/output interface 1805, radio frequency (RF) interface 1809, network connection interface 1811, memory 1815 including random access memory (RAM) 1817, read-only memory (ROM) 1819, and storage medium 1821 or the like, communication subsystem 1831, power source 1833, and/or any other component, or any combination thereof. Storage medium 1821 includes operating system 1823, application program 1825, and data 1827. In other embodiments, storage medium 1821 may include other similar types of information. Certain UEs may utilize all of the components shown in FIG. 18, or only a subset of the components. The level of integration between the components may vary from one UE to another UE. Further, certain UEs may contain multiple instances of a component, such as multiple processors, memories, transceivers, transmitters, receivers, etc.

In FIG. 18, processing circuitry 1801 may be configured to process computer instructions and data. Processing circuitry 1801 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1801 may include two central processing units (CPUs). Data may be information in a form suitable for use by a computer.

In the depicted embodiment, input/output interface 1805 may be configured to provide a communication interface to an input device, output device, or input and output device. UE 1800 may be configured to use an output device via input/output interface 1805. An output device may use the same type of interface port as an input device. For example, a USB port may be used to provide input to and output from UE 1800. The output device may be a speaker, a sound card, a video card, a display, a monitor, a printer, an actuator, an emitter, a smartcard, another output device, or any combination thereof. UE 1800 may be configured to use an input device via input/output interface 1805 to allow a user to capture information into UE 1800. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 18, RF interface 1809 may be configured to provide a communication interface to RF components such as a transmitter, a receiver, and an antenna. Network connection interface 1811 may be configured to provide a communication interface to network 1843*a*. Network 1843*a* may encompass wired and/or wireless networks such as a local-area network (LAN), a wide-area network (WAN), a computer network, a wireless network, a telecommunications network, another like network or any combination thereof. For example, network 1843*a* may comprise a Wi-Fi network. Network connection interface 1811 may be configured to include a receiver and a transmitter interface used to communicate with one or more other devices over a communication network according to one or more communication protocols, such as Ethernet, TCP/IP, SONET, ATM, or the like. Network connection interface 1811 may implement receiver and transmitter functionality appropriate to the communication network links (e.g., optical, electrical, and the like). The transmitter and receiver functions may share circuit components, software or firmware, or alternatively may be implemented separately.

RAM 1817 may be configured to interface via bus 1802 to processing circuitry 1801 to provide storage or caching of data or computer instructions during the execution of software programs such as the operating system, application programs, and device drivers. ROM 1819 may be configured to provide computer instructions or data to processing circuitry 1801. For example, ROM 1819 may be configured to store invariant low-level system code or data for basic system functions such as basic input and output (I/O), startup, or reception of keystrokes from a keyboard that are stored in a non-volatile memory. Storage medium 1821 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1821 may be configured to include operating system 1823, application program 1825 such as a web browser application, a widget or gadget engine or another application, and data file 1827. Storage medium 1821 may store, for use by UE 1800, any of a variety of various operating systems or combinations of operating systems.

Storage medium 1821 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1821 may allow UE 1800 to access computer-executable instructions, application programs or the like, stored on transitory or non-transitory memory media, to off-load data, or to upload data. An article of manufacture, such as one utilizing a communication system may be tangibly embodied in storage medium 1821, which may comprise a device readable medium.

In FIG. 18, processing circuitry 1801 may be configured to communicate with network 1843*b* using communication subsystem 1831. Network 1843*a* and network 1843*b* may be the same network or networks or different network or networks. Communication subsystem 1831 may be configured to include one or more transceivers used to communicate with network 1843*b*. For example, communication subsystem 1831 may be configured to include one or more transceivers used to communicate with one or more remote transceivers of another device capable of wireless communication such as another WD, UE, or base station of a radio access network (RAN) according to one or more communication protocols, such as IEEE 802.5, CDMA, WCDMA, GSM, LTE, UTRAN, WiMax, or the like. Each transceiver may include transmitter 1833 and/or receiver 1835 to implement transmitter or receiver functionality, respectively, appropriate to the RAN links (e.g., frequency allocations and the like). Further, transmitter 1833 and receiver 1835 of each transceiver may share circuit components, software or firmware, or alternatively may be implemented separately.

In the illustrated embodiment, the communication functions of communication subsystem 1831 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1831 may include cellular communication, Wi-Fi communication, Bluetooth communication, and GPS communication. Network 1843*b* may encompass wired and/or wireless networks such as a local-area network (LAN), a wide-area network (WAN), a computer network, a wireless network, a telecommunications network, another like network or any combination thereof. For example, network 1843*b* may be a cellular network, a Wi-Fi network, and/or a near-field network. Power source 1813 may be configured to provide alternating current (AC) or direct current (DC) power to components of UE 1800.

The features, benefits and/or functions described herein may be implemented in one of the components of UE 1800 or partitioned across multiple components of UE 1800. Further, the features, benefits, and/or functions described herein may be implemented in any combination of hardware, software or firmware. In one example, communication subsystem 1831 may be configured to include any of the components described herein. Further, processing circuitry 1801 may be configured to communicate with any of such components over bus 1802. In another example, any of such components may be represented by program instructions stored in memory that when executed by processing circuitry 1801 perform the corresponding functions described herein. In another example, the functionality of any of such components may be partitioned between processing circuitry 1801 and communication subsystem 1831. In another example, the non-computationally intensive functions of any of such components may be implemented in software or firmware and the computationally intensive functions may be implemented in hardware.

Figure 19:
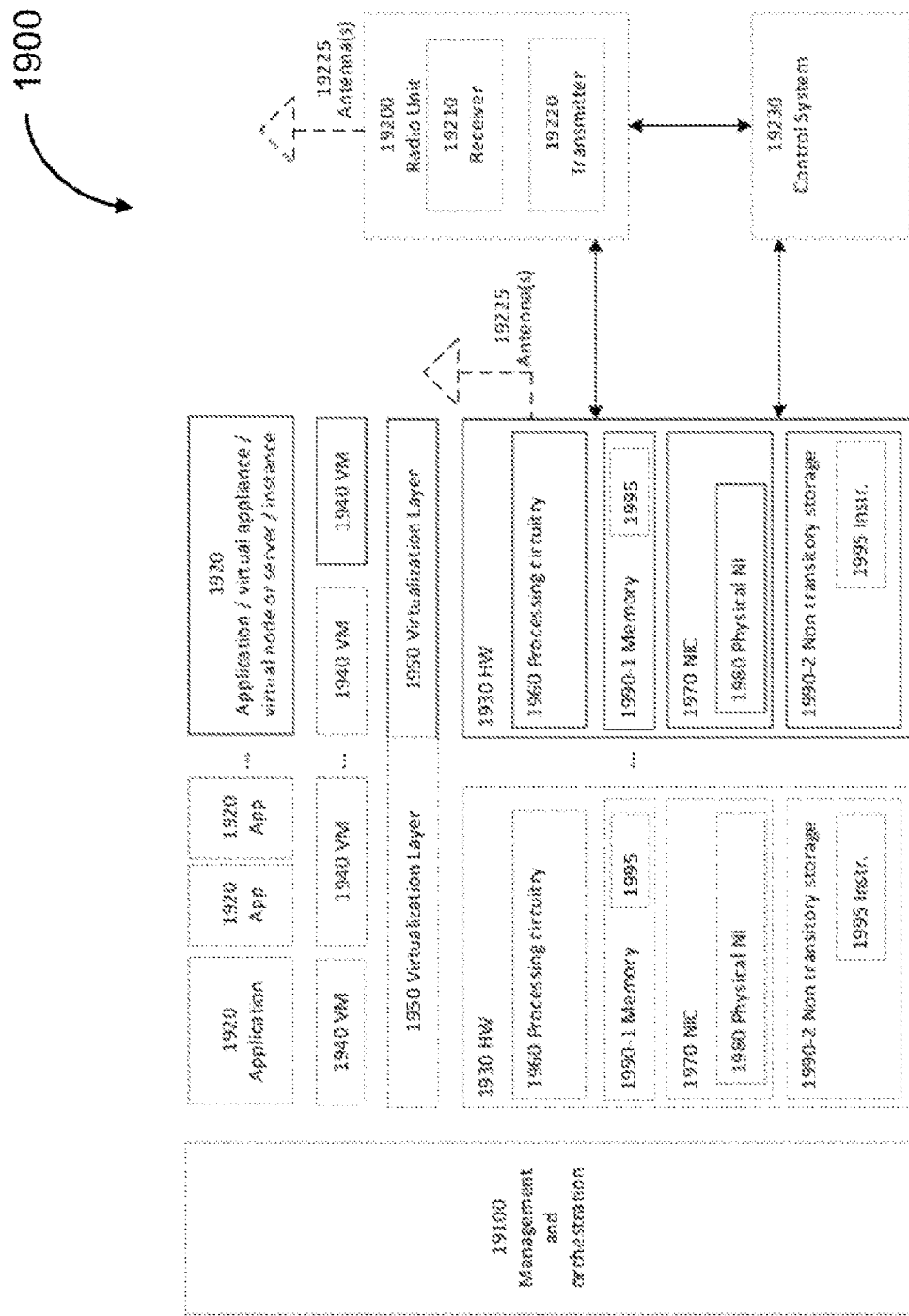
FIG. 19 illustrates an example virtualization environment, according to certain embodiments.

FIG. 19 illustrates an example virtualization environment, according to certain embodiments. FIG. 19 is a schematic block diagram illustrating a virtualization environment 1900 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1900 hosted by one or more of hardware nodes 1930. Further, in embodiments in which the virtual node is not a radio access node or does not require radio connectivity (e.g., a core network node), then the network node may be entirely virtualized.

The functions may be implemented by one or more applications 1920 (which may alternatively be called software instances, virtual appliances, network functions, virtual nodes, virtual network functions, etc.) operative to implement some of the features, functions, and/or benefits of some of the embodiments disclosed herein. Applications 1920 are run in virtualization environment 1900 which provides hardware 1930 comprising processing circuitry 1960 and memory 1990. Memory 1990 contains instructions 1995 executable by processing circuitry 1960 whereby application 1920 is operative to provide one or more of the features, benefits, and/or functions disclosed herein.

Virtualization environment 1900, comprises general-purpose or special-purpose network hardware devices 1930 comprising a set of one or more processors or processing circuitry 1960, which may be commercial off-the-shelf (COTS) processors, dedicated Application Specific Integrated Circuits (ASICs), or any other type of processing circuitry including digital or analog hardware components or special purpose processors. Each hardware device may comprise memory 1990-1 which may be non-persistent memory for temporarily storing instructions 1995 or software executed by processing circuitry 1960. Each hardware device may comprise one or more network interface controllers (NICs) 1970, also known as network interface cards, which include physical network interface 1980. Each hardware device may also include non-transitory, persistent, machine-readable storage media 1990-2 having stored therein software 1995 and/or instructions executable by processing circuitry 1960. Software 1995 may include any type of software including software for instantiating one or more virtualization layers 1950 (also referred to as hypervisors), software to execute virtual machines 1940 as well as software allowing it to execute functions, features and/or benefits described in relation with some embodiments described herein.

Virtual machines 1940, comprise virtual processing, virtual memory, virtual networking or interface and virtual storage, and may be run by a corresponding virtualization layer 1950 or hypervisor. Different embodiments of the instance of virtual appliance 1920 may be implemented on one or more of virtual machines 1940, and the implementations may be made in different ways.

During operation, processing circuitry 1960 executes software 1995 to instantiate the hypervisor or virtualization layer 1950, which may sometimes be referred to as a virtual machine monitor (VMM). Virtualization layer 1950 may present a virtual operating platform that appears like networking hardware to virtual machine 1940.

As shown in FIG. 19, hardware 1930 may be a standalone network node with generic or specific components. Hardware 1930 may comprise antenna 19225 and may implement some functions via virtualization. Alternatively, hardware 1930 may be part of a larger cluster of hardware (e.g. such as in a data center or customer premise equipment (CPE)) where many hardware nodes work together and are managed via management and orchestration (MANO) 19100, which, among others, oversees lifecycle management of applications 1920.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 1940 may be a software implementation of a physical machine that runs programs as if they were executing on a physical, non-virtualized machine. Each of virtual machines 1940, and that part of hardware 1930 that executes that virtual machine, be it hardware dedicated to that virtual machine and/or hardware shared by that virtual machine with others of the virtual machines 1940, forms a separate virtual network elements (VNE).

Still in the context of NFV, Virtual Network Function (VNF) is responsible for handling specific network functions that run in one or more virtual machines 1940 on top of hardware networking infrastructure 1930 and corresponds to application 1920 in FIG. 19.

In some embodiments, one or more radio units 19200 that each include one or more transmitters 19220 and one or more receivers 19210 may be coupled to one or more antennas 19225. Radio units 19200 may communicate directly with hardware nodes 1930 via one or more appropriate network interfaces and may be used in combination with the virtual components to provide a virtual node with radio capabilities, such as a radio access node or a base station.

In some embodiments, some signaling can be affected with the use of control system 19230 which may alternatively be used for communication between the hardware nodes 1930 and radio units 19200.

Figure 20:
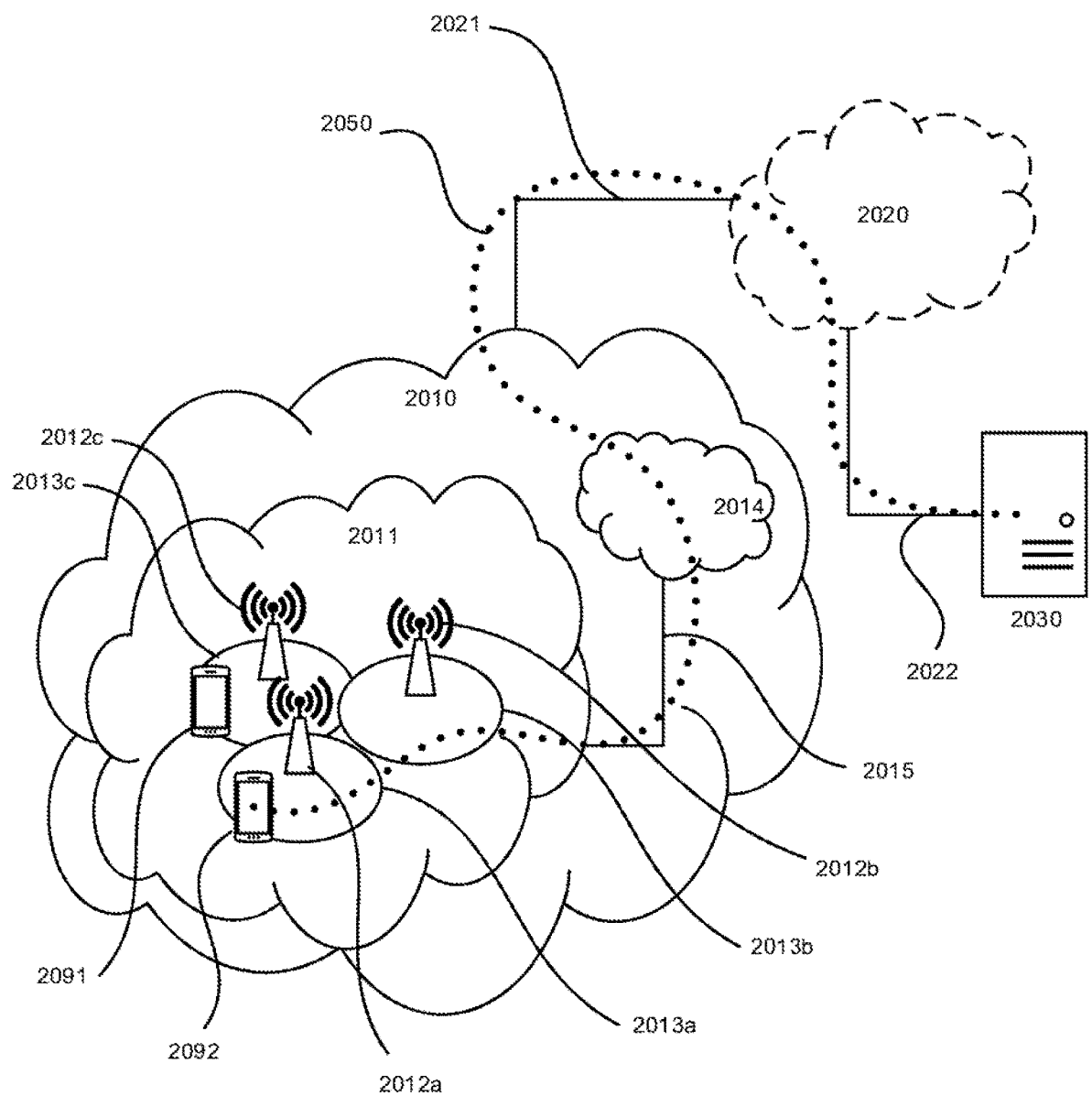
FIG. 20 illustrates an example telecommunication network connected via an intermediate network to a host computer, according to certain embodiments.

FIG. 20 illustrates an example telecommunication network connected via an intermediate network to a host computer, according to certain embodiments. With reference to FIG. 20, in accordance with an embodiment, a communication system includes telecommunication network 2010, such as a 3GPP-type cellular network, which comprises access network 2011, such as a radio access network, and core network 2014. Access network 2011 comprises a plurality of base stations 2012*a*, 2012*b*, 2012*c*, such as NBs, eNBs, gNBs or other types of wireless access points, each defining a corresponding coverage area 2013*a*, 2013*b*, 2013*c*. Each base station 2012*a*, 2012*b*, 2012*c* is connectable to core network 2014 over a wired or wireless connection 2015. A first UE 2091 located in coverage area 2013*c* is configured to wirelessly connect to, or be paged by, the corresponding base station 2012*c*. A second UE 2092 in coverage area 2013*a* is wirelessly connectable to the corresponding base station 2012*a*. While a plurality of UEs 2091, 2092 are illustrated in this example, the disclosed embodiments are equally applicable to a situation where a sole UE is in the coverage area or where a sole UE is connecting to the corresponding base station 2012.

Telecommunication network 2010 is itself connected to host computer 2030, which may be embodied in the hardware and/or software of a standalone server, a cloud-implemented server, a distributed server or as processing resources in a server farm. Host computer 2030 may be under the ownership or control of a service provider, or may be operated by the service provider or on behalf of the service provider. Connections 2021 and 2022 between telecommunication network 2010 and host computer 2030 may extend directly from core network 2014 to host computer 2030 or may go via an optional intermediate network 2020. Intermediate network 2020 may be one of, or a combination of more than one of, a public, private or hosted network; intermediate network 2020, if any, may be a backbone network or the Internet; in particular, intermediate network 2020 may comprise two or more sub-networks (not shown).

The communication system of FIG. 20 as a whole enables connectivity between the connected UEs 2091, 2092 and host computer 2030. The connectivity may be described as an over-the-top (OTT) connection 2050. Host computer 2030 and the connected UEs 2091, 2092 are configured to communicate data and/or signaling via OTT connection 2050, using access network 2011, core network 2014, any intermediate network 2020 and possible further infrastructure (not shown) as intermediaries. OTT connection 2050 may be transparent in the sense that the participating communication devices through which OTT connection 2050 passes are unaware of routing of uplink and downlink communications. For example, base station 2012 may not or need not be informed about the past routing of an incoming downlink communication with data originating from host computer 2030 to be forwarded (e.g., handed over) to a connected UE 2091. Similarly, base station 2012 need not be aware of the future routing of an outgoing uplink communication originating from the UE 2091 towards the host computer 2030.

Figure 21:
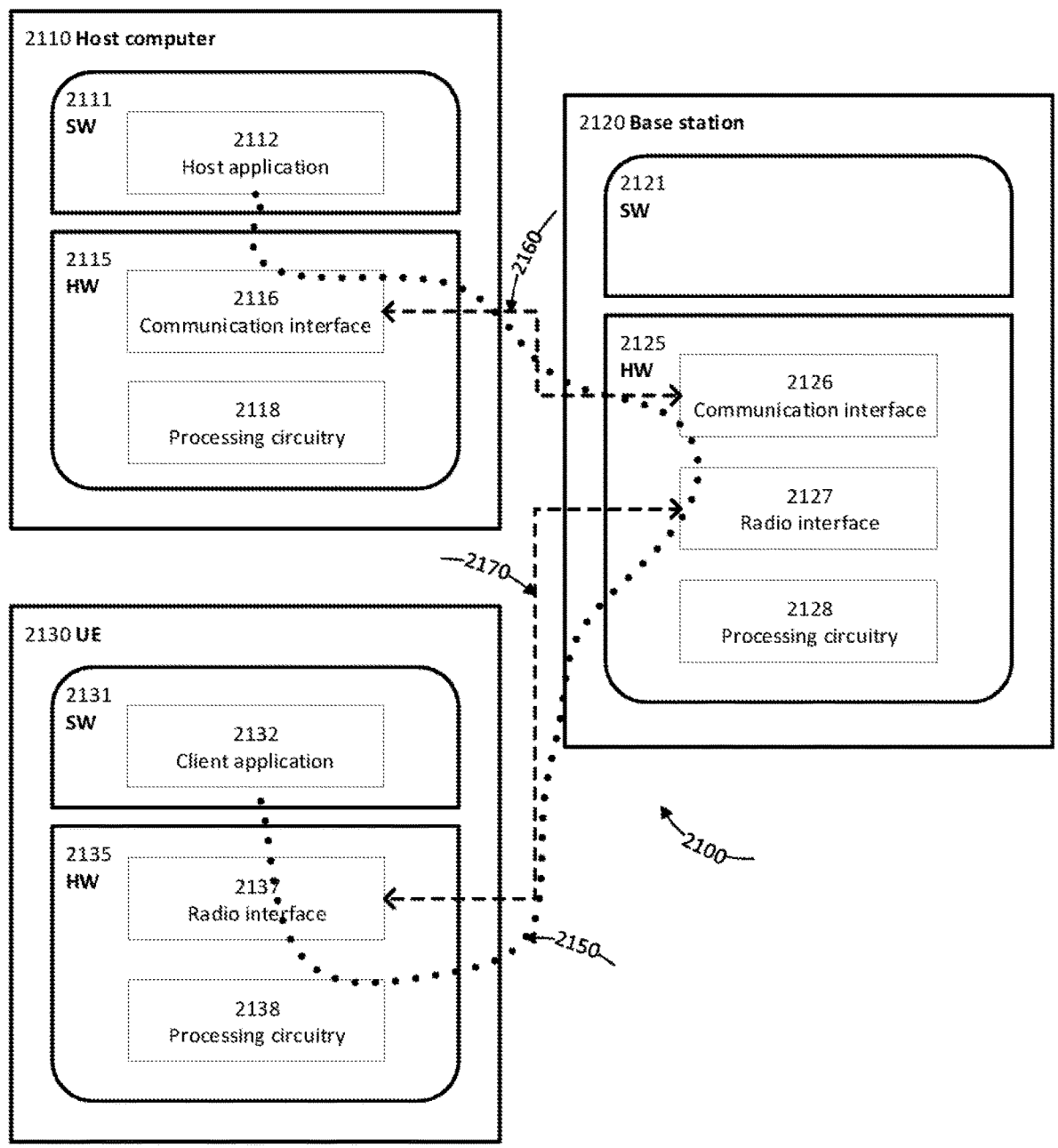
FIG. 21 illustrates an example host computer communicating via a base station with a user equipment over a partially wireless connection, according to certain embodiments.

FIG. 21 illustrates an example host computer communicating via a base station with a user equipment over a partially wireless connection, in accordance with some embodiments. Example implementations, in accordance with an embodiment, of the UE, base station and host computer discussed in the preceding paragraphs will now be described with reference to FIG. 21. In communication system 2100, host computer 2110 comprises hardware 2115 including communication interface 2116 configured to set up and maintain a wired or wireless connection with an interface of a different communication device of communication system 2100. Host computer 2110 further comprises processing circuitry 2118, which may have storage and/or processing capabilities. In particular, processing circuitry 2118 may comprise one or more programmable processors, application-specific integrated circuits, field programmable gate arrays or combinations of these (not shown) adapted to execute instructions. Host computer 2110 further comprises software 2111, which is stored in or accessible by host computer 2110 and executable by processing circuitry 2118. Software 2111 includes host application 2112. Host application 2112 may be operable to provide a service to a remote user, such as UE 2130 connecting via OTT connection 2150 terminating at UE 2130 and host computer 2110. In providing the service to the remote user, host application 2112 may provide user data which is transmitted using OTT connection 2150.

Communication system 2100 further includes base station 2120 provided in a telecommunication system and comprising hardware 2125 enabling it to communicate with host computer 2110 and with UE 2130. Hardware 2125 may include communication interface 2126 for setting up and maintaining a wired or wireless connection with an interface of a different communication device of communication system 2100, as well as radio interface 2127 for setting up and maintaining at least wireless connection 2170 with UE 2130 located in a coverage area (not shown in FIG. 21) served by base station 2120. Communication interface 2126 may be configured to facilitate connection 2160 to host computer 2110. Connection 2160 may be direct or it may pass through a core network (not shown in FIG. 21) of the telecommunication system and/or through one or more intermediate networks outside the telecommunication system. In the embodiment shown, hardware 2125 of base station 2120 further includes processing circuitry 2128, which may comprise one or more programmable processors, application-specific integrated circuits, field programmable gate arrays or combinations of these (not shown) adapted to execute instructions. Base station 2120 further has software 2121 stored internally or accessible via an external connection.

Communication system 2100 further includes UE 2130 already referred to. In certain embodiments, the UE 2130 may be the user equipment as described with respect to FIG. 18. Its hardware 2135 may include radio interface 2137 configured to set up and maintain wireless connection 2170 with a base station serving a coverage area in which UE 2130 is currently located. Hardware 2135 of UE 2130 further includes processing circuitry 2138, which may comprise one or more programmable processors, application-specific integrated circuits, field programmable gate arrays or combinations of these (not shown) adapted to execute instructions. UE 2130 further comprises software 2131, which is stored in or accessible by UE 2130 and executable by processing circuitry 2138. Software 2131 includes client application 2132. Client application 2132 may be operable to provide a service to a human or non-human user via UE 2130, with the support of host computer 2110. In host computer 2110, an executing host application 2112 may communicate with the executing client application 2132 via OTT connection 2150 terminating at UE 2130 and host computer 2110. In providing the service to the user, client application 2132 may receive request data from host application 2112 and provide user data in response to the request data. OTT connection 2150 may transfer both the request data and the user data. Client application 2132 may interact with the user to generate the user data that it provides.

It is noted that host computer 2110, base station 2120 and UE 2130 illustrated in FIG. 21 may be similar or identical to host computer 2030, one of base stations 2012a, 2012b, 2012c and one of UEs 2091, 2092 of FIG. 20, respectively. This is to say, the inner workings of these entities may be as shown in FIG. 21 and independently, the surrounding network topology may be that of FIG. 20.

In FIG. 21, OTT connection 2150 has been drawn abstractly to illustrate the communication between host computer 2110 and UE 2130 via base station 2120, without explicit reference to any intermediary devices and the precise routing of messages via these devices. Network infrastructure may determine the routing, which it may be configured to hide from UE 2130 or from the service provider operating host computer 2110, or both. While OTT connection 2150 is active, the network infrastructure may further take decisions by which it dynamically changes the routing (e.g., on the basis of load balancing consideration or reconfiguration of the network).

Wireless connection 2170 between UE 2130 and base station 2120 is in accordance with the teachings of the embodiments described throughout this disclosure. One or more of the various embodiments improve the performance of OTT services provided to UE 2130 using OTT connection 2150, in which wireless connection 2170 forms the last segment. More precisely, the teachings of these embodiments may improve the handling of redundant data in the transmit buffer and thereby provide benefits such as improved efficiency in radio resource use (e.g., not transmitting redundant data) as well as reduced delay in receiving new data (e.g., by removing redundant data in the buffer, new data can be transmitted sooner).

A measurement procedure may be provided for the purpose of monitoring data rate, latency and other factors on which the one or more embodiments improve. There may further be an optional network functionality for reconfiguring OTT connection 2150 between host computer 2110 and UE 2130, in response to variations in the measurement results. The measurement procedure and/or the network functionality for reconfiguring OTT connection 2150 may be implemented in software 2111 and hardware 2115 of host computer 2110 or in software 2131 and hardware 2135 of UE 2130, or both. In embodiments, sensors (not shown) may be deployed in or in association with communication devices through which OTT connection 2150 passes; the sensors may participate in the measurement procedure by supplying values of the monitored quantities exemplified above, or supplying values of other physical quantities from which software 2111, 2131 may compute or estimate the monitored quantities. The reconfiguring of OTT connection 2150 may include message format, retransmission settings, preferred routing etc.; the reconfiguring need not affect base station 2120, and it may be unknown or imperceptible to base station 2120. Such procedures and functionalities may be known and practiced in the art. In certain embodiments, measurements may involve proprietary UE signaling facilitating host computer 2110's measurements of throughput, propagation times, latency and the like. The measurements may be implemented in that software 2111 and 2131 causes messages to be transmitted, in particular empty or 'dummy' messages, using OTT connection 2150 while it monitors propagation times, errors etc.

Figure 22:
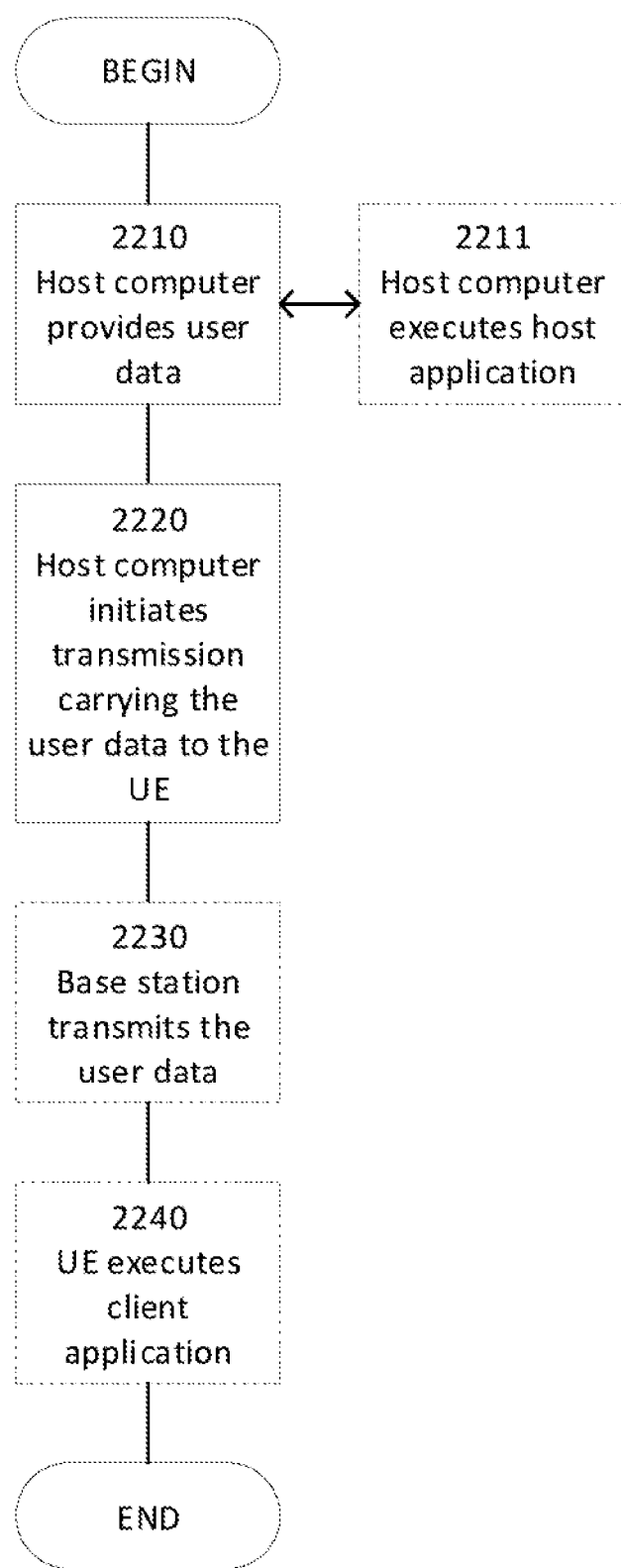
FIG. 22 illustrates an example method implemented in a communication system including a host computer, a base station and a user equipment, according to certain embodiments.

FIG. 22 illustrates an example method implemented in a communication system including a host computer, a base station and a user equipment, according to certain embodiments in accordance with some embodiments. More specifically, FIG. 22 is a flowchart illustrating a method implemented in a communication system, in accordance with one embodiment. The communication system includes a host computer, a base station and a UE which may be a user equipment described with reference to FIG. 18. For simplicity of the present disclosure, only drawing references to FIG. 22 will be included in this section. In step 2210, the host computer provides user data. In substep 2211 (which may be optional) of step 2210, the host computer provides the user data by executing a host application. In step 2220, the host computer initiates a transmission carrying the user data to the UE. In step 2230 (which may be optional), the base station transmits to the UE the user data which was carried in the transmission that the host computer initiated, in accordance with the teachings of the embodiments described throughout this disclosure. In step 2240 (which may also be optional), the UE executes a client application associated with the host application executed by the host computer.

Figure 23:
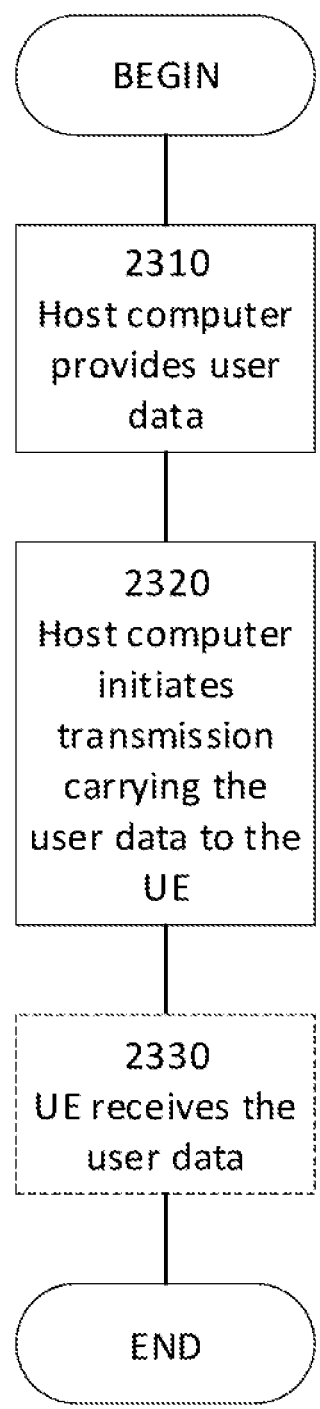
FIG. 23 illustrates another example method implemented in a communication system including a host computer, a base station and a user equipment, according to certain embodiments.

FIG. 23 illustrates an example method implemented in a communication system including a host computer, a base station and a user equipment, in accordance with some embodiments. More specifically, FIG. 23 is a flowchart illustrating a method implemented in a communication system, in accordance with one embodiment. The communication system includes a host computer, a base station and a UE which may be a user equipment described with reference to FIG. 18. For simplicity of the present disclosure, only drawing references to FIG. 23 will be included in this section. In step 2310 of the method, the host computer provides user data. In an optional substep (not shown) the host computer provides the user data by executing a host application. In step 2320, the host computer initiates a transmission carrying the user data to the UE. The transmission may pass via the base station, in accordance with the teachings of the embodiments described throughout this disclosure. In step 2330 (which may be optional), the UE receives the user data carried in the transmission.

Figure 24:
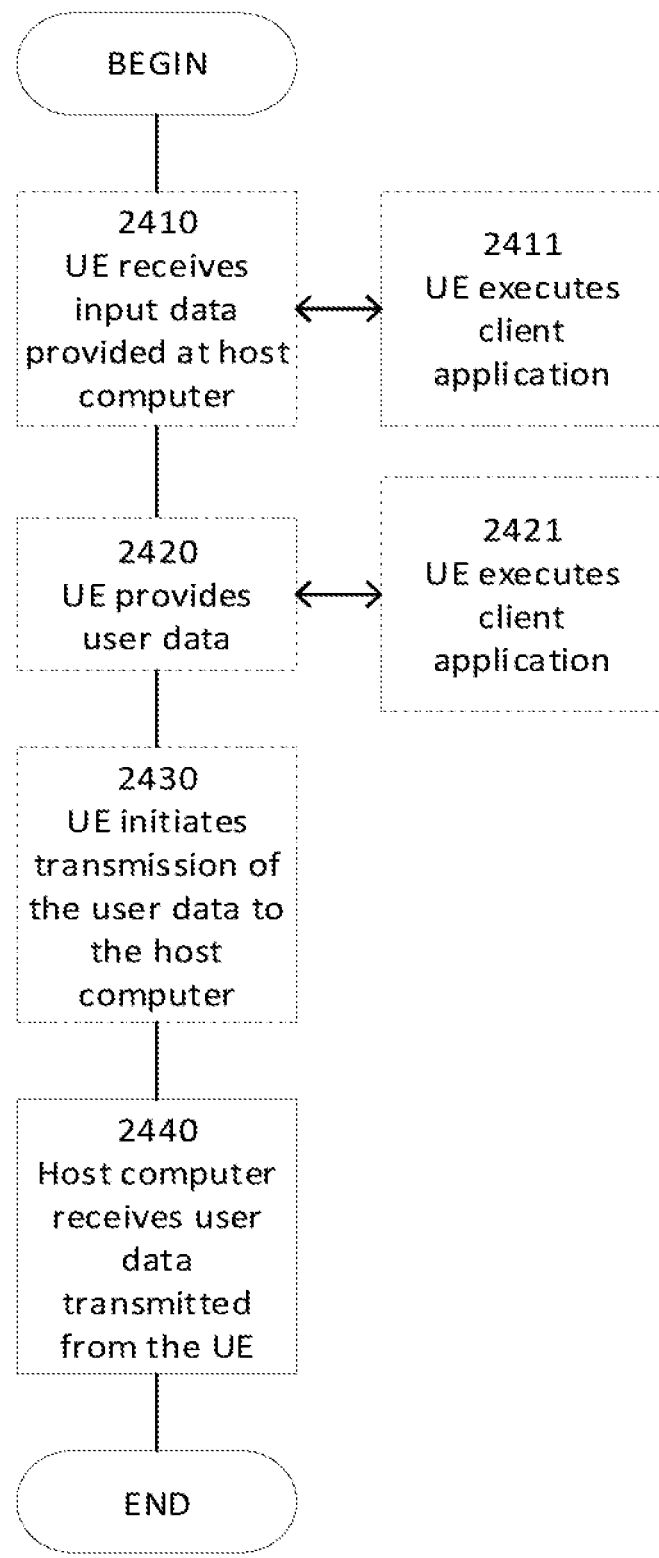
FIG. 24 illustrates another further example method implemented in a communication system including a host computer, a base station and a user equipment, according to certain embodiments.

FIG. 24 illustrates another further example method implemented in a communication system including a host computer, a base station and a user equipment, in accordance with some embodiments. More specifically, FIG. 24 is a flowchart illustrating a method implemented in a communication system, in accordance with one embodiment. The communication system includes a host computer, a base station and a UE which may be a user equipment described with reference to FIG. 18. For simplicity of the present disclosure, only drawing references to FIG. 24 will be included in this section. In step 2410 (which may be optional), the UE receives input data provided by the host computer. Additionally or alternatively, in step 2420, the UE provides user data. In substep 2421 (which may be optional) of step 2420, the UE provides the user data by executing a client application. In substep 2411 (which may be optional) of step 2410, the UE executes a client application which provides the user data in reaction to the received input data provided by the host computer. In providing the user data, the executed client application may further consider user input received from the user. Regardless of the specific manner in which the user data was provided, the UE initiates, in substep 2430 (which may be optional), transmission of the user data to the host computer. In step 2440 of the method, the host computer receives the user data transmitted from the UE, in accordance with the teachings of the embodiments described throughout this disclosure.

Figure 25:
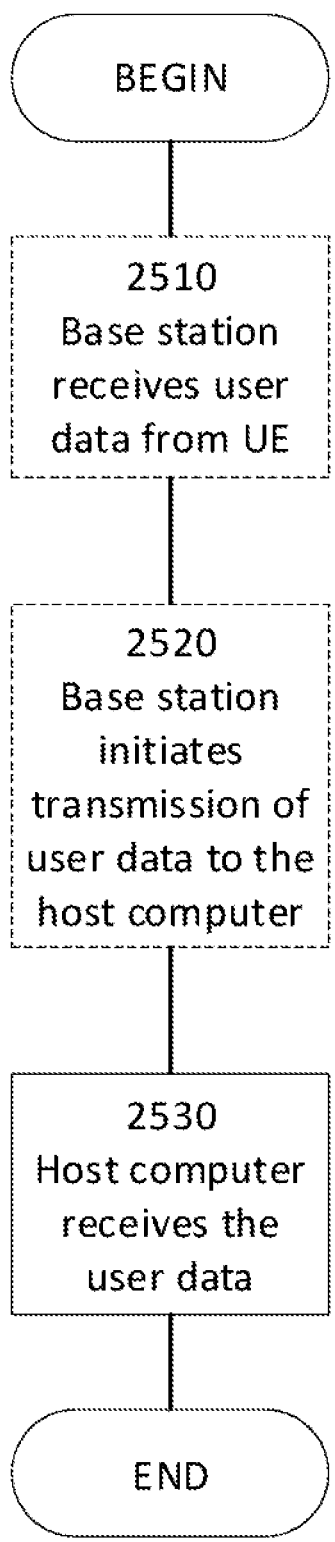
FIG. 25 illustrates another yet example method implemented in a communication system including a host computer, a base station and a user equipment, according to certain embodiments.

FIG. 25 illustrates another example method implemented in a communication system including a host computer, a base station and a user equipment, in accordance with some embodiments. More specifically, FIG. 25 is a flowchart illustrating a method implemented in a communication system, in accordance with one embodiment. The communication system includes a host computer, a base station and a UE. For simplicity of the present disclosure, only drawing references to FIG. 25 will be included in this section. In step 2510 (which may be optional), in accordance with the teachings of the embodiments described throughout this disclosure, the base station receives user data from the UE. In step 2520 (which may be optional), the base station initiates transmission of the received user data to the host computer. In step 2530 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 26:
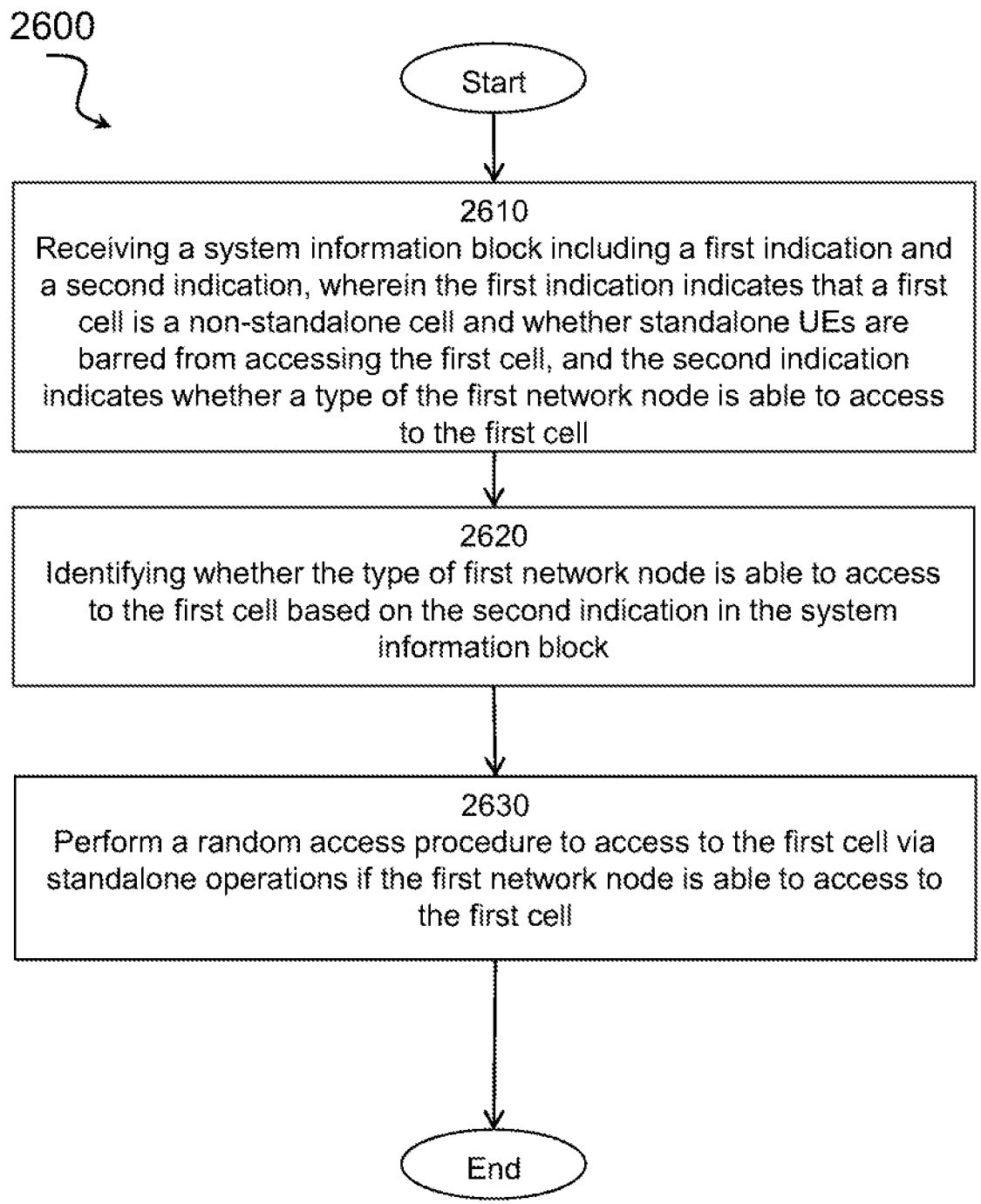
FIG. 26 illustrates a flow diagram of an example method in a network node, in accordance with certain embodiments.

FIG. 26 is a flow diagram of another example method performed at a network node, in accordance with certain embodiments. Method 2600 begins at step 2610 with a first network node receiving a system information block including a first indication and a second indication. In some embodiments, the first indication may indicate that a first cell is a non-standalone cell and whether standalone UEs are barred from accessing the first cell. In some embodiments, the second indication may indicate whether a type of the first network node is able to access the first cell. In some embodiments, the system information block may further comprise a third indication which indicates that a user equipment of the standalone UEs is able to access the first cell. In some embodiments, the method 2600 may further comprise receiving a second system information block, wherein the second system information block is used for standalone operations and is only read by the type of the first network node when the type of the first cell is allowed to be accessed by the first network node.

At step 2620, the method 2600 may comprise identifying whether the type of the first network node is able to access the first cell based on the second indication in the system information block. In some embodiments, the first network node may be able to access the first cell when the second indication indicates that the first cell is reserved but is not reserved for the type of the first network node. In some embodiments, the first network node is able to access the first cell when the second indication indicates that the first cell is reserved but set to allow the type of the first network node. In some embodiments, the first indication may be reservedNR-Cell which is configured or present, and the second indication may ReservedNR-CellExceptions. In some embodiments, the first network node may be able to access the first cell when the second indication comprises a cell access list indicating that the type of the first network node is able to access the first cell. In some embodiments, the first indication may reservedNR-Cell which is configured or present, and the cell access list may be included in cellAccessRelatedInfoList. In some embodiments, the first network node is able to access the first cell when the second indication does not comprise a barring value for the type of the first network node.

At step 2630, the method 2600 may comprise performing a random access procedure to access the first cell via standalone operations, in response to identifying that the type of the first network node is able to access the first cell based on the second indication in the system information block.

Figure 27:
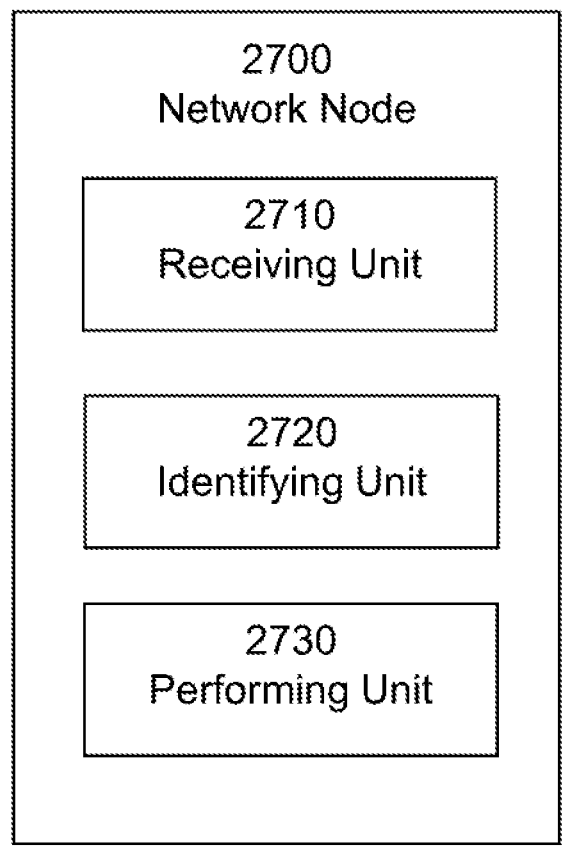
FIG. 27 illustrates a block schematic of an example network node, in accordance with certain embodiments.

FIG. 27 is a schematic block diagram of an exemplary network node 2700 in a wireless network, in accordance with certain embodiments. In some embodiments, the wireless network may be the wireless network 1606 shown in FIG. 16. The network node may be implemented in a wireless device (e.g., wireless device 1610 shown in FIG. 16). The network node 2700 is operable to carry out the example method described with reference to FIG. 26 and possibly any other processes or methods disclosed herein. It is also to be understood that the method of FIG. 26 is not necessarily carried out solely by the network node 2700. At least some operations of the method can be performed by one or more other entities.

Network node 2700 may comprise processing circuitry, which may include one or more microprocessor or microcontrollers, as well as other digital hardware, which may include digital signal processors (DSPs), special-purpose digital logic, and the like. In some embodiments, the processing circuitry of the network node 2700 may be the processing circuitry 1670 shown in FIG. 16. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 2710, identifying unit 2720, and performing unit 2730, and any other suitable units of network node 2700 to perform corresponding functions according one or more embodiments of the present disclosure, such as a receiver and a transmitter.

As illustrated in FIG. 27, network node 2700 includes the receiving unit 2710, the identifying unit 2720, and the performing unit 2730. The receiving unit 2710 may be configured to receive a system information block including a first indication and a second indication. In some embodiments, the first indication may indicate that a first cell is a non-standalone cell and whether standalone UEs are barred from accessing the first cell. In some embodiments, the second indication may indicate whether a type of the first network node is able to access the first cell. In some embodiments, the system information block may further comprise a third indication which indicates that a user equipment of the standalone UEs is able to access the first cell. In some embodiments, the receiving unit 2710 may further receive a second system information block, wherein the second system information block is used for standalone operations and is only read by the type of the first network node when the first cell is allowed to be accessed by the type of the first network node.

The identifying unit 2720 may be configured to identify whether the type of the first network node is able to access the first cell based on the second indication in the system information block. In some embodiments, the first network node may be able to access the first cell when the second indication indicates that the first cell is reserved but is not reserved for the type of the first network node. In some embodiments, the first network node is able to access the first cell when the second indication indicates that the first cell is reserved but set to allow the type of the first network node. In some embodiments, the first indication may be reservedNR-Cell which is configured or present, and the second indication may ReservedNR-CellExceptions. In some embodiments, the first network node may be able to access the first cell when the second indication comprises a cell access list indicating that the type of the first network node is able to access the first cell. In some embodiments, the first indication may reservedNR-Cell which is configured or present, and the cell access list may be included in cellAccessRelatedInfoList. In some embodiments, the first network node is able to access the first cell when the second indication does not comprise a barring value for the type of the first network node.

The performing unit 2730 may be configured to perform a random access procedure to access the first cell via standalone operations, in response to identifying that the type of the first network node is able to access the first cell based on the second indication in the system information block.

The term unit may have conventional meaning in the field of electronics, electrical devices and/or electronic devices and may include, for example, electrical and/or electronic circuitry, devices, modules, processors, receivers, transmitters, memories, logic solid state and/or discrete devices, computer programs or instructions for carrying out respective tasks, procedures, computations, outputs, and/or displaying functions, and so on, as such as those that are described herein.

According to various embodiments, an advantage of features herein is that enabling a relay node to operate in a non-standalone cell using standalone operations by barring all standalone UEs to access the non-standalone cell but only allowing the relay node, so that the master node is not required to have specific functionality to support the relay node, and furthermore, both access and backhaul link in EN-DC are supported.

While processes in the figures may show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the claims below.

The following examples provide a non-limiting example of how certain aspects of the proposed solutions could be implemented within the framework of a specific communication standard. In particular, the following examples provide a non-limiting example of how the proposed solutions could be implemented within the framework of a 3GPP TSG RAN standard. The changes described are merely intended to illustrate how certain aspects of the proposed solutions could be implemented in a particular standard. However, the proposed solutions could also be implemented in other suitable manners, both in the 3GPP Specification and in other specifications or standards.

The study item on integrated access and backhaul aims at supporting NR nodes and their cells, e.g. IAB nodes in the present disclosure, which are self-backhauled using the NR radio interface to other NR nodes, i.e. gNBs, which are connected to a traditional transport network. The purpose of this contribution is to discuss if integrated access and backhaul may be supported both when using standalone NR and when using EN-DC on the access and/or on the backhaul links.

At the last RAN2 meeting the following agreements were made:

---

4i  For NSA on the access the relay is applied to the NR SCG path only, SA and NSA on the access link will be supported.
4ii  For both SA and NSA backhaul, backhaul traffic over the LTE radio interface will not be studied, and both NSA and SA for the backhaul links will be studied.
4iii  For both 4i and 4ii, the priority within the NSA options will be to consider the EN-DC case but this does not preclude study for other NSA options.
4iv  Further study of the possible combinations of SA and NSA access and backhaul is needed to fully determine the scope of what will be studied.

---

For using EN-DC and SA NR on the access link, both SA and NSA using EN-DC on access link may be supported from the RAN2 agreement.

Figure 13:
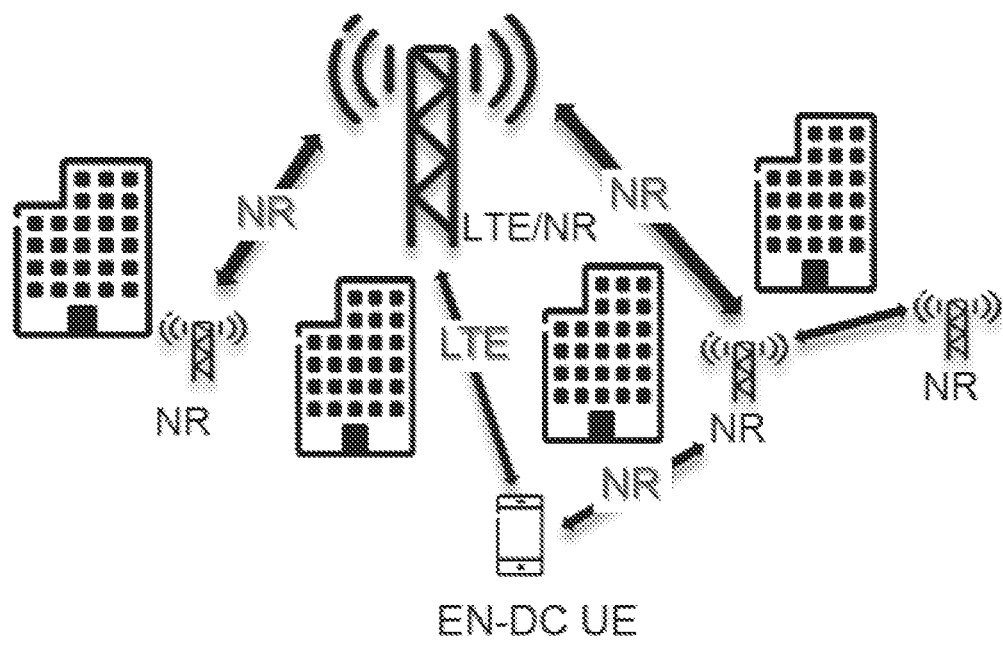
FIG. 13 illustrates an example scenario of using EN-DC for IAB nodes.

An example deployment for IAB using EN-DC may be a macro grid LTE network which is densified by adding new micro nodes which some are backhauled using IAB. In this example scenario the macro sites are upgraded to also support NR which is in addition to LTE and the micro sites only support NR as shown in FIG. 13.

Figure 14:
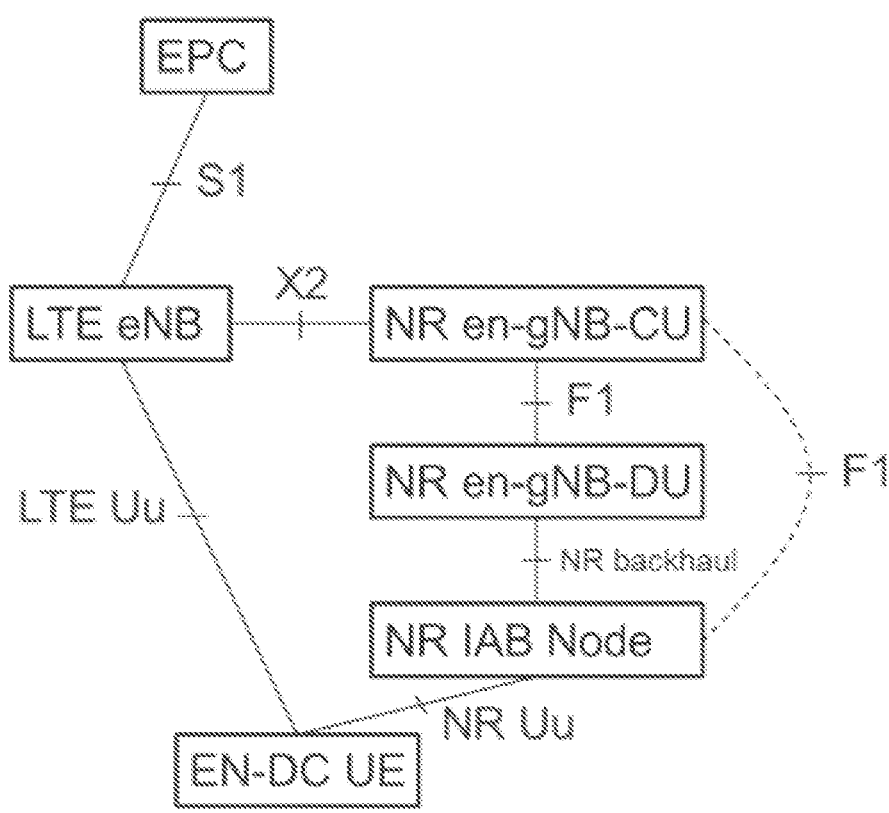
FIG. 14 illustrates an example logical architecture for operating in EN-DC utilizing LTE wide area coverage and NR as a data boost.

In this case, it may be possible to operate in EN-DC utilizing LTE wide area coverage and NR as a data boost. The EN-DC solution allows separation of the LTE and NR using non-ideal transport meaning it may be feasible for the EN-DC solution to support the IAB scenario where the NR node serving the UE is wirelessly backhauled using another NR node. FIG. 14 shows a high-level logical architecture for this scenario where the NR node being wirelessly backhauled over NR performs the functions of an en-gNB-DU serving the NR SCG link. The NR node is labelled as NR IAB Node in FIG. 14.

The present disclosure proposes the following proposals for the above scenario: (1) The existing EN-DC solution, including X2 interface functions, should be applicable for IAB nodes supported EN-DC UEs; and (2) No IAB specific impact is foreseen on the LTE eNB for supporting EN-DC on the access link.

Figure 15:
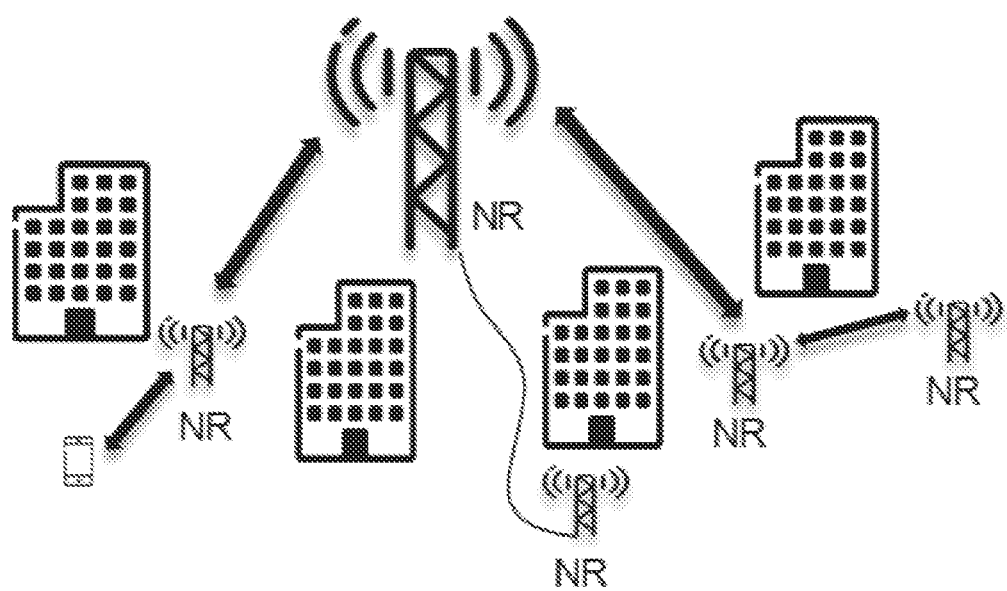
FIG. 15 illustrates an example scenario of using standalone NR on both the access and backhaul link.

It is assumed that integrated access and backhaul may be supported also in standalone NR deployment, for this reason it is assumed that the standard may also support IAB when using standalone NR both on the access and backhaul link to allow full NR only deployments as shown in FIG. 15.

The present disclosure proposes another proposal for the above scenario: The standard may support IAB when using standalone NR both on the access and backhaul links.

For using EN-DC and SA on backhaul link, given that the IAB backhaul link is a network internal link, there is more flexibility how this link would need to be realized compared to the access link which needs to inter-work with millions of devices and/or UEs including legacy devices. For this reason, it may be discussed if both EN-DC and SA NR may also be supported on the backhaul link. This scenario and its high-level logical architecture are illustrated in FIGS. 13 and 14.

One argument for supporting EN-DC may be that if the rest of the network including the Packet Core do not support standalone NR, it would not be feasible to connect the IAB node using standalone NR. There are few observations regarding backhaul link listed below:

Observation 1: Supporting EN-DC on the IAB backhaul link would be useful in networks that do not support standalone NR. On the other hand, since on the backhaul link both nodes are network nodes, it is at least easier to upgrade them to support standalone NR. Other arguments why standalone NR might be enough for the backhaul link is that it is expected that the IAB node may be deployed at a site with a good NR coverage and would not require LTE from radio coverage perspective.

Observation 2: IAB nodes are expected to be deployed at sites with a good NR coverage, meaning EN-DC on the backhaul link is not required from a radio coverage perspective. Another potential issue with supporting both EN-DC and SA on the backhaul link is that this requires, from standardization point of view, two different CN solutions as well as two different NAS protocols for providing connectivity functionality for the IAB node. It may also be that the solution would look different between the two CNs since the different functional splits and CP/UP separation is applied in EPC and 5GC.

Observation 3: Supporting EN-DC and SA on backhaul link may require, from standardization point of view, the support for two different CN solutions and NAS protocols for providing connectivity functionality for the IAB node.

The solutions may also be affected by the different functional splits and CP/UP separation of EPC and 5GC. A further issue with using EN-DC for the backhaul link is that most likely, this means that IAB specific functionality may also be required in the LTE eNB serving the IAB node, as the functionalities needed at the LTE MN for serving the IAB node may be quite different from that needed for serving a UE. Exactly what functionalities are needed remains to be seen, but at least there may be some basic functionality related to CN selection, slicing, and the like that are not applicable to a UE.

Observation 4: Supporting EN-DC on the backhaul link will most likely impact the LTE eNBs serving the IAB nodes. Nevertheless, if there is a strong market need to support both EN-DC and SA NR also on the backhaul link, it is assumed this is technically possible to support in the same way as for the access link. For EN-DC, the IAB node will initially connect to LTE and then it will be assigned a secondary NR node and NR SCG radio configuration, while for NR SA, the IAB node will connect directly to NR nodes. It is assumed that the IAB node will in most cases stay in RRC connected/DC when serving traffic to the end-user. It is also assumed that most of the data may go on the NR radio leg, i.e. SCG bearer, meaning that once the IAB node is connected, the solutions for both the EN-DC and SA backhaul link would look quite similar.

Observation 5: Once the IAB node is in connected state, the EN-DC and SA NR solution for the backhaul link would look quite similar, assuming only the NR leg is used for data transfer.

For solutions to minimize the impacts on two different CN/NAS and solutions for IAB nodes, assuming it is required to support both EN-DC and SA NR on the IAB backhaul link, it would be very beneficial to minimize the differences between the two solutions. Below are some approaches: (1) Utilizing NR slicing, and Decor to assign a dedicated CN to handle IAB nodes. Both NR/5GC and LTE/EPC provide mechanisms for selecting a dedicated CN for certain devices. Utilizing a dedicated CN for IAB nodes is beneficial since it avoids impacts to the CN serving end users and it allows the CN to be tailored to serve the specific needs of the IAB nodes, such as, only support minimum functionality needed. It also would make it possible for the operator to package all CN functions serving IAB nodes using both EN-DC and SA NR together. For the above scenario, it is proposed that slicing and (e) Decor may be explored to support IAB nodes in a dedicated CN tailored to support IAB nodes only.

Regarding another approach of only supporting minimum CN functionality for IAB node, another way to minimize the differences between EN-DC and SA NR is to only support a minimum subset of CN functions to setup IAB nodes. It is assumed at least the following functions would be needed: (1) Authentication and Session key generation for IAB nodes; (2) Assignment of IP address to the IAB node; (3) Selection of UPF, and P/S-GW function, wherein all the RAN nodes may potentially "recommend" which GW to use as discussed for SIPTO in LTE; and (4) Creation of RAN context for IAB nodes, such as security keys, initial bearers, possible UE radio access capabilities. Mobility functions, or advanced QoS functions etc. may also not be needed. Functions that may easily be handled by RAN are also not needed.

Yet another approach is that only minimum CN/NAS functionality is specified for allowing IAB nodes to connect to the network.

To summarize the observations and their corresponding proposals in supporting NR nodes, the observations are listed below:

Observation 1: Supporting EN-DC on the IAB backhaul link would be useful in networks that do not support standalone NR;

Observation 2: IAB nodes are expected to be deployed at sites with a good NR coverage, meaning EN-DC on the backhaul link is not required from a radio coverage perspective;

Observation 3: Supporting EN-DC and SA on backhaul link may require, from standardization point of view, the support for two different CN solutions and NAS protocols for providing connectivity functionality for the IAB node. The solutions may also be affected by the different functional splits and CP/UP separation of EPC and 5GC;

Observation 4: Supporting EN-DC on the backhaul link will most likely impact the LTE eNBs, which is a master node, serving the IAB nodes; and Observation 5: Once the IAB node is in connected state, the EN-DC and SA NR solution for the backhaul link would look quite similar, assuming only the NR leg is used for data transfer.

Based on the discussion above, it is proposed as the following:

Proposal 1: The existing EN-DC solution, including X2 interface functions, may be applicable for IAB nodes supported EN-DC UEs;

Proposal 2: No IAB specific impact is foreseen on the LTE eNB for supporting EN-DC on the access link;

Proposal 3: The standard may support IAB when using standalone NR both on the access and backhaul links;

Proposal 4: Slicing and (e) Decor may be explored to support IAB nodes in a dedicated CN tailored to support IAB nodes only;

Proposal 5: Only minimum CN/NAS functionality should be specified for allowing IAB nodes to connect to the network.

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier RRC Radio Resource Control
RRM Radio Resource Management
RS Reference Signal
RSCP Received Signal Code Power
RSRP Reference Symbol Received Power or Reference Signal Received Power
RSRQ Reference Signal Received Quality or Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method for enabling operations for a relay node comprising:
receiving, at a first network node, a system information block including a first indication and a second indication, wherein the first indication indicates that a first cell is a non-standalone cell and whether standalone user equipments (UEs) are barred from accessing the first cell, and the second indication indicates whether a type of the first network node is able to access the first cell; and
identifying, at the first network node, whether the type of the first network node is able to access the first cell based on the second indication in the system information block.

2. The method according to claim 1, wherein the first network node is able to access the first cell when the second indication indicates that the first cell is reserved but is not reserved for the type of the first network node.

3. The method according to claim 1, wherein the first network node is able to access the first cell when the second indication indicates that the first cell is reserved but set to allow the type of the first network node.

4. The method according to claim 2, wherein the first indication is reservedNR-Cell which is configured or present, and the second indication is ReservedNR-CellExeptions.

5. The method according to claim 1, wherein the first network node is able to access the first cell when the second indication comprises a cell access list indicating that the type of the first network node is able to access the first cell.

6. The method according to claim 5, wherein the first indication is reservedNR-Cell which is configured or present, and the cell access list is included in cellAccessRelatedInfoList.

7. The method according to claim 1, wherein the first network node is able to access the first cell when the second indication does not comprise a barring value for the type of the first network node.

8. The method according to claim 1, wherein the system information block further comprises a third indication which indicates that a user equipment of the standalone UEs is able to access the first cell.

9. The method according to claim 1, further comprising receiving, at the first network node, a second system information block, wherein the second system information block is used for standalone operations and is only read by the type of the first network node when the first cell is allowed to be accessed by the type of the first network node.

10. The method according to claim 1, further comprising performing, at the first network node, a random access procedure to access the first cell via standalone operations, in response to identifying that the type of the first network node is able to access the first cell based on the second indication in the system information block.

11. A network node for enabling operations for a relay node comprising:
at least one processing circuitry; and
at least one storage that stores processor-executable instructions, when executed by the processing circuitry, causes a network node to:
receive a system information block including a first indication and the second indication, wherein the first indication indicates that a first cell is a non-standalone cell and whether standalone user equipments (UEs) are barred from accessing the first cell, and the second indication indicates whether a type of the network node is able to access the first cell; and
identify whether the type of the network node is able to access the first cell based on the second indication in the system information block.

12. The network node according to claim 11, wherein the network node is able to access the first cell when the second indication indicates that the first cell is reserved but is not reserved for the type of the network node.

13. The network node according to claim 11, wherein the network node is able to access the first cell when the second indication indicates that the first cell is reserved but set to allow the type of the network node.

14. The network node according to claim 12, wherein the first indication is reservedNR-Cell which is configured or present, and the second indication is ReservedNR-CellExeptions.

15. The network node according to claim 11, wherein the network node is able to access the first cell when the second indication comprises a cell access list indicating that the type of the network node is able to access the first cell.

16. The network node according to claim 15, wherein the first indication is reservedNR-Cell which is configured or present, and the cell access list is included in cellAccessRelatedInfoList.

17. The network node according to claim 11, wherein the network node is able to access the first cell when the second indication does not comprise a barring value for the type of the network node.

18. The network node according to claim 11, wherein the system information block further comprises a third indication which indicates that a user equipment of the standalone UEs is able to access the first cell.

19. The network node according to claim 11, wherein the instructions further cause the network node to receive a second system information block, wherein the second system information block is used for standalone operations and is only read by the network node when the first cell is allowed to be accessed by the network node.

20. The network node according to claim 11, wherein the instructions further cause the network node to, in response to identifying that the type of the network node is able to access the first cell based on the second indication in the system information block, perform a random access procedure to access the first cell via standalone operations.

21. A network node for enabling operations for a relay node comprising:
   at least one processing circuitry; and
   at least one storage that stores processor-executable instructions, when executed by the processing circuitry, causes a network node to:
      broadcast, to relay nodes and user equipments (UEs) in a first cell, a system information block including a first indication and the second indication, wherein the first indication indicates that the first cell is a non-standalone cell and whether standalone UEs are barred from accessing the first cell, and the second indication indicates whether the relay nodes are able to access the first cell.

22. A communication system for enabling operations for a relay node comprising at least two network nodes:
   a first network node comprising at least one processing circuitry configured to:
      broadcast, to relay nodes and user equipments (UEs) in a first cell, a system information block including a first indication and the second indication, wherein the first indication indicates that a first cell is a non-standalone cell and whether standalone UEs are barred from accessing the first cell, and the second indication indicates whether the relay nodes are able to access the first cell; and
   a second network node of the relay nodes comprising at least one processing circuitry configured to:
      receive, from the first network node, the system information block including the first indication and the second indication;
      identify whether the first cell is allowed to be accessed by the relay nodes based on the second indication in the system information block.

* * * * *